United States Patent
Yang et al.

(10) Patent No.: US 12,408,081 B2
(45) Date of Patent: *Sep. 2, 2025

(54) DYNAMIC RATE MATCHING PATTERNS FOR SPECTRUM SHARING

(71) Applicant: QUALCOMM Incorporated, San Diego, CA (US)

(72) Inventors: Ming Yang, San Diego, CA (US); Kausik Ray Chaudhuri, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 69 days.

This patent is subject to a terminal disclaimer.

(21) Appl. No.: 18/531,472

(22) Filed: Dec. 6, 2023

(65) Prior Publication Data
US 2024/0179572 A1    May 30, 2024

Related U.S. Application Data

(63) Continuation of application No. 17/343,635, filed on Jun. 9, 2021, now Pat. No. 11,871,277.

(51) Int. Cl.
*H04W 28/12* (2009.01)
*H04B 17/345* (2015.01)
*H04W 16/14* (2009.01)

(52) U.S. Cl.
CPC .......... *H04W 28/12* (2013.01); *H04B 17/345* (2015.01); *H04W 16/14* (2013.01)

(58) Field of Classification Search
CPC ..... H04W 28/12; H04W 16/14; H04W 24/08; H04W 72/541; H04B 17/345;
(Continued)

(56) References Cited

U.S. PATENT DOCUMENTS

| 2012/0113844 A1 | 5/2012 | Krishnamurthy |
| 2013/0003589 A1 | 1/2013 | Gage et al. |

(Continued)

FOREIGN PATENT DOCUMENTS

| EP | 2332278 B1 | 5/2017 |
| EP | 4040831 A1 | 8/2022 |

(Continued)

OTHER PUBLICATIONS

Ericsson: "CRS Rate-Matching Enhancement for DSS", 3GPP TSG-RAN WG1 #105e, R1-2105799, 3rd Generation Partnership Project (3GPP), Mobile Competence Centre, 650, Route Des Lucioles, F-06921 Sophia-Antipolis Cedex, France, vol. RAN WG1, No. eMeeting, May 10, 2021-May 27, 2021, May 12, 2021, 2 Pages, XP052011724, The whole document.

(Continued)

*Primary Examiner* — Sudesh M. Patidar
(74) *Attorney, Agent, or Firm* — Holland & Hart LLP

(57) ABSTRACT

Methods, systems, and devices for dynamic rate matching patterns for spectrum sharing are described. In some examples, a user equipment (UE) may measure one or more interference levels associated with resources of a physical resource block (e.g., interference levels associated with respective subcarriers or other division in the frequency domain, with respective symbol durations or other division in the time domain, or a combination thereof), and determine a rate matching pattern based on the interference level measurements. In some examples, the rate matching pattern may include a pattern of resources for communications between the UE and a base station (e.g., for downlink communications). The UE may transmit an indication of the rate matching pattern to the base station, and the base station may schedule or transmit one or more subsequent downlink (Continued)

transmissions based at least in part on the indication of the rate matching pattern received from the UE.

30 Claims, 16 Drawing Sheets

(58) Field of Classification Search
CPC ... H04L 1/0026; H04L 5/0048; H04L 5/0064; H04L 5/0044; H04L 5/0053; H04L 5/0073; H04L 27/2646; H04L 5/0091; H04L 5/006
See application file for complete search history.

(56) References Cited

U.S. PATENT DOCUMENTS

| | | |
|---|---|---|
| 2014/0078976 A1 | 3/2014 | Novak et al. |
| 2014/0126496 A1 | 5/2014 | Sayana et al. |
| 2016/0036541 A1 | 2/2016 | Siomina et al. |
| 2017/0085326 A1 | 3/2017 | Li et al. |
| 2017/0245259 A1* | 8/2017 | Islam .................. H04L 5/0023 |
| 2019/0068348 A1 | 2/2019 | Nam |
| 2019/0260537 A1 | 8/2019 | Seo et al. |
| 2020/0396037 A1 | 12/2020 | Liu et al. |
| 2021/0227522 A1 | 7/2021 | Lin et al. |
| 2022/0183015 A1 | 6/2022 | Jang et al. |
| 2022/0400409 A1 | 12/2022 | Yang et al. |

FOREIGN PATENT DOCUMENTS

| | | |
|---|---|---|
| KR | 20220080654 A | 6/2022 |
| WO | WO-2021244561 A1 * | 12/2021 |

OTHER PUBLICATIONS

Intel Corporation: "Discussion on CRS Interference Handling in Scenarios with Overlapping Spectrum for LTE and NR", 3GPP TSG-RAN WG4 Meeting #99-e, R4-2109200, 3rd Generation Partnership Project (3GPP), Mobile Competence Centre, 650, Route Des Lucioles, F-06921 Sophia-Antipolis Cedex, France, vol. RAN WG4, No. E-meeting, May 19, 2021-May 27, 2021, May 11, 2021, 8 Pages, XP052011924, The whole document.
International Search Report and Written Opinion—PCT/US2022/032562—ISA/EPO—Oct. 10, 2022 (2104320WO).
Mediatek Inc: "Discussion on DSS for LTE CRS Interference Handling", 3GPP TSG RAN#91E, RP-210646, 3rd Generation Partnership Project, Mobile Competence Centre, 650, Route Des Lucioles, F-06921 Sophia-Antipolis Cedex, France, vol. TSG RAN, No. 20210301, Agenda Item 9.7.17, pp. 1-8, Mar. 15, 2021, XP051986070, p. 1, p. 3, p. 7.
ZTE, et al., "TEI Proposal: on Aperiodic CSI/CSI-RS", 3GPP TSG RAN WG1 Meeting #98, 3GPP Draft; R1-1909541 TEI Proposal on Aperiodic CSI and CSI-RS, 3rd Generation Partnership Project (3GPP), Mobile Competence Centre; 658, Route Des Lucioles; F-06921 Sophia-Antipolis Cedex; France, vol. RAN WG1, No. Prague, CZ; Aug. 26, 2019-Aug. 30, 2019, Sep. 3, 2019 (Sep. 3, 2019), 4 Pages, XP051766141, The whole document.

* cited by examiner

US 12,408,081 B2

DYNAMIC RATE MATCHING PATTERNS FOR SPECTRUM SHARING

CROSS REFERENCE

This present Application for Patent is a continuation of U.S. patent application Ser. No. 17/343,635 by YANG et al., entitled "DYNAMIC RATE MATCHING PATTERNS FOR SPECTRUM SHARING," filed Jun. 9, 2021, which is assigned to the assignee hereof, and is expressly incorporated by reference herein.

FIELD OF TECHNOLOGY

The following relates to wireless communications, including dynamic rate matching patterns for spectrum sharing.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, neighboring base stations or cells may share a portion of a radio frequency spectrum. For example, in a wireless communications system configured for dynamic spectrum sharing (DSS), neighboring base stations or cells configured to use different radio access technologies may use the same or overlapping portions of a radio frequency spectrum band.

SUMMARY

The described techniques relate to improved methods, systems, devices, and apparatuses that support dynamic rate matching patterns for spectrum sharing. For example, a UE may perform measurements to evaluate a local interference condition for resources in accordance with a structure of resources in the frequency domain and the time domain, which may correspond to a resource allocation or scheduling structure (e.g., a transmission time interval (TTI) structure). In some examples, the UE may perform interference measurements for resources of a physical resource block structure, such as interference measurements for respective subcarriers of the physical resource block, interference measurements for respective symbol durations of the physical resource block, or both (e.g., interference measurements at a resource element level). The UE may determine a rate matching pattern for the physical resource block based on the interference measurements, which may include a pattern of resources in the frequency domain (e.g., a pattern of resources of the subcarriers of the physical resource block), a pattern of resources in the time domain (e.g., a pattern of resources of the symbol durations or symbol indexes of the physical resource block), or both (e.g., a respective pattern, for each symbol duration or symbol index of the physical resource block, of the subcarriers of the physical resource block).

The UE may transmit an indication of the rate matching pattern to a base station (e.g., a base station serving the UE), and the base station may schedule or transmit one or more subsequent downlink transmissions (e.g., transmissions of a physical downlink shared channel (PDSCH)) with a resource allocation that is determined based at least in part on the indication of the rate matching pattern received from the UE. For example, the base station may map a downlink transmission to resources in accordance with the indicated rate matching pattern (e.g., in cases where the indication indicates resources associated with relatively low interference or that are otherwise more suitable for downlink reception), or the base station may map a downlink transmission to resources that avoid those indicated by the rate matching pattern (e.g., in cases where the indication indicates resources associated with relatively high interference or that are otherwise less suitable for downlink reception). In some examples, the base station may determine a rate matching pattern for a downlink transmission based on the indication received from the UE and one or more other factors, such as an availability of resources, a size of the downlink transmission, a priority of the downlink transmission, or a balancing of available resources among or across a group of UEs or associated downlink transmissions, among other factors. In various examples, a rate matching pattern determined by the base station may or may not be the same as, or otherwise overlapping with, a rate matching pattern indicated by the UE, and thus may include or be otherwise accompanied by an indication of the rate matching patter determined by the base station.

A method for wireless communication is described. The method may include measuring, at a user equipment (UE), an interference level associated with a physical resource block, determining a rate matching pattern based on the measuring, the rate matching pattern including a pattern of resources associated with a downlink transmission, transmitting, to a base station, an indication of the rate matching pattern, and receiving the downlink transmission from the base station based on transmitting the indication of the rate matching pattern.

An apparatus for wireless communication is described. The apparatus may include a processor, memory in electronic communication with the processor, and instructions stored in the memory. The instructions may be executable by the processor to measure an interference level associated with a physical resource block, determine a rate matching pattern based on the measuring, the rate matching pattern including a pattern of resources associated with a downlink transmission, transmit, to a base station, an indication of the rate matching pattern, and receive the downlink transmission from the base station based on transmitting the indication of the rate matching pattern.

Another apparatus for wireless communication is described. The apparatus may include means for measuring an interference level associated with a physical resource block, means for determining a rate matching pattern based on the measuring, the rate matching pattern including a pattern of resources associated with a downlink transmission, means for transmitting, to a base station, an indication of the rate matching pattern, and means for receiving the downlink transmission from the base station based on transmitting the indication of the rate matching pattern.

A non-transitory computer-readable medium storing code for wireless communication is described. The code may include instructions executable to measure, at a UE, an interference level associated with a physical resource block, determine a rate matching pattern based on the measuring, the rate matching pattern including a pattern of resources associated with a downlink transmission, transmit, to a base station, an indication of the rate matching pattern, and receive the downlink transmission from the base station based on transmitting the indication of the rate matching pattern.

In some examples of the method, apparatuses, and non-transitory computer-readable medium described herein, the rate matching pattern may include a pattern of resources of a set of multiple subcarriers, a pattern of resources of a set of multiple symbol durations, or a combination thereof.

In some examples of the method, apparatuses, and non-transitory computer-readable medium described herein, the measuring may include operations, features, means, or instructions for measuring a respective interference level for each subcarrier of a set of multiple subcarriers of the physical resource block.

In some examples of the method, apparatuses, and non-transitory computer-readable medium described herein, the measuring may include operations, features, means, or instructions for measuring, for each symbol duration of a set of multiple symbol durations of the physical resource block, the respective interference level for each subcarrier of the set of multiple subcarriers.

In some examples of the method, apparatuses, and non-transitory computer-readable medium described herein, determining the rate matching pattern may include operations, features, means, or instructions for determining a first rate matching pattern for a first subset of the set of multiple symbol durations and determining a second rate matching pattern for a second subset of the set of multiple symbol durations.

In some examples of the method, apparatuses, and non-transitory computer-readable medium described herein, the first subset of the set of multiple symbol durations may be associated with transmission of a reference signal in accordance with a first radio access technology.

In some examples of the method, apparatuses, and non-transitory computer-readable medium described herein, determining the first rate matching pattern may include operations, features, means, or instructions for determining the pattern of resources in the frequency domain to avoid the reference signal in accordance with the first radio access technology.

In some examples of the method, apparatuses, and non-transitory computer-readable medium described herein, the rate matching pattern may be associated with downlink transmission in accordance with a second radio access technology.

Some examples of the method, apparatuses, and non-transitory computer-readable medium described herein may further include operations, features, means, or instructions for receiving control signaling from the base station and transmitting the indication of the rate matching pattern based on receiving the control signaling.

Some examples of the method, apparatuses, and non-transitory computer-readable medium described herein may further include operations, features, means, or instructions for determining that the interference level satisfies a threshold and transmitting the indication of the rate matching pattern based on determining that the interference level satisfies the threshold.

Some examples of the method, apparatuses, and non-transitory computer-readable medium described herein may further include operations, features, means, or instructions for determining that a received transmission satisfies an error threshold and transmitting the indication of the rate matching pattern based on determining that the received transmission satisfies the error threshold.

In some examples of the method, apparatuses, and non-transitory computer-readable medium described herein, receiving the downlink transmission may include operations, features, means, or instructions for receiving the downlink transmission on resources in accordance with the indicated rate matching pattern.

Some examples of the method, apparatuses, and non-transitory computer-readable medium described herein may further include operations, features, means, or instructions for receiving an indication of a resource mapping based on the indicated rate matching pattern and receiving the downlink transmission on resources in accordance with the indicated resource mapping.

In some examples of the method, apparatuses, and non-transitory computer-readable medium described herein, the measuring may include operations, features, means, or instructions for measuring the respective interference level for each subcarrier in accordance with a periodic interval.

A method for wireless communication is described. The method may include receiving, at a base station, an indication of a rate matching pattern from a UE, the rate matching pattern including a pattern of resources associated with a downlink transmission and transmitting, to the UE, the downlink transmission using an allocation of resources of a physical resource block that is based on the indication of the rate matching pattern.

An apparatus for wireless communication is described. The apparatus may include a processor, memory in electronic communication with the processor, and instructions stored in the memory. The instructions may be executable to receive an indication of a rate matching pattern from a UE, the rate matching pattern including a pattern of resources associated with a downlink transmission and transmit, to the UE, the downlink transmission using an allocation of resources of a physical resource block that is based on the indication of the rate matching pattern.

Another apparatus for wireless communication is described. The apparatus may include means for receiving an indication of a rate matching pattern from a UE, the rate matching pattern including a pattern of resources associated with a downlink transmission and means for transmitting, to the UE, the downlink transmission using an allocation of resources of a physical resource block that is based on the indication of the rate matching pattern.

A non-transitory computer-readable medium storing code for wireless communication is described. The code may include instructions executable to receive, at a base station, an indication of a rate matching pattern from a UE, the rate matching pattern including a pattern of resources associated with a downlink transmission and transmit, to the UE, the downlink transmission using an allocation of resources of a physical resource block that is based on the indication of the rate matching pattern.

In some examples of the method, apparatuses, and non-transitory computer-readable medium described herein, the rate matching pattern may include a pattern of resources of a set of multiple subcarriers, a pattern of resources of a set of multiple symbol durations, or a combination thereof.

In some examples of the method, apparatuses, and non-transitory computer-readable medium described herein, receiving the indication of the rate matching pattern may include operations, features, means, or instructions for receiving an indication of a first rate matching pattern for a first subset of a set of multiple symbol durations and a second rate matching pattern for a second subset of the set of multiple symbol durations.

In some examples of the method, apparatuses, and non-transitory computer-readable medium described herein, the first subset of the set of multiple symbol durations may be associated with transmission of a reference signal in accordance with a first radio access technology.

In some examples of the method, apparatuses, and non-transitory computer-readable medium described herein, the pattern of resources may avoid the reference signal in accordance with the first radio access technology.

In some examples of the method, apparatuses, and non-transitory computer-readable medium described herein, the rate matching pattern may be associated with the downlink transmission in accordance with a second radio access technology.

Some examples of the method, apparatuses, and non-transitory computer-readable medium described herein may further include operations, features, means, or instructions for transmitting control signaling to the UE and receiving the indication of the rate matching pattern based on transmitting the control signaling.

In some examples of the method, apparatuses, and non-transitory computer-readable medium described herein, transmitting the downlink transmission may include operations, features, means, or instructions for transmitting the downlink transmission on resources in accordance with the indicated rate matching pattern.

Some examples of the method, apparatuses, and non-transitory computer-readable medium described herein may further include operations, features, means, or instructions for determining a resource mapping based on the indicated rate matching pattern, transmitting an indication of the determined resource mapping, and transmitting the downlink transmission on resources in accordance with the indicated resource mapping.

DETAILED DESCRIPTION

Figure 1:
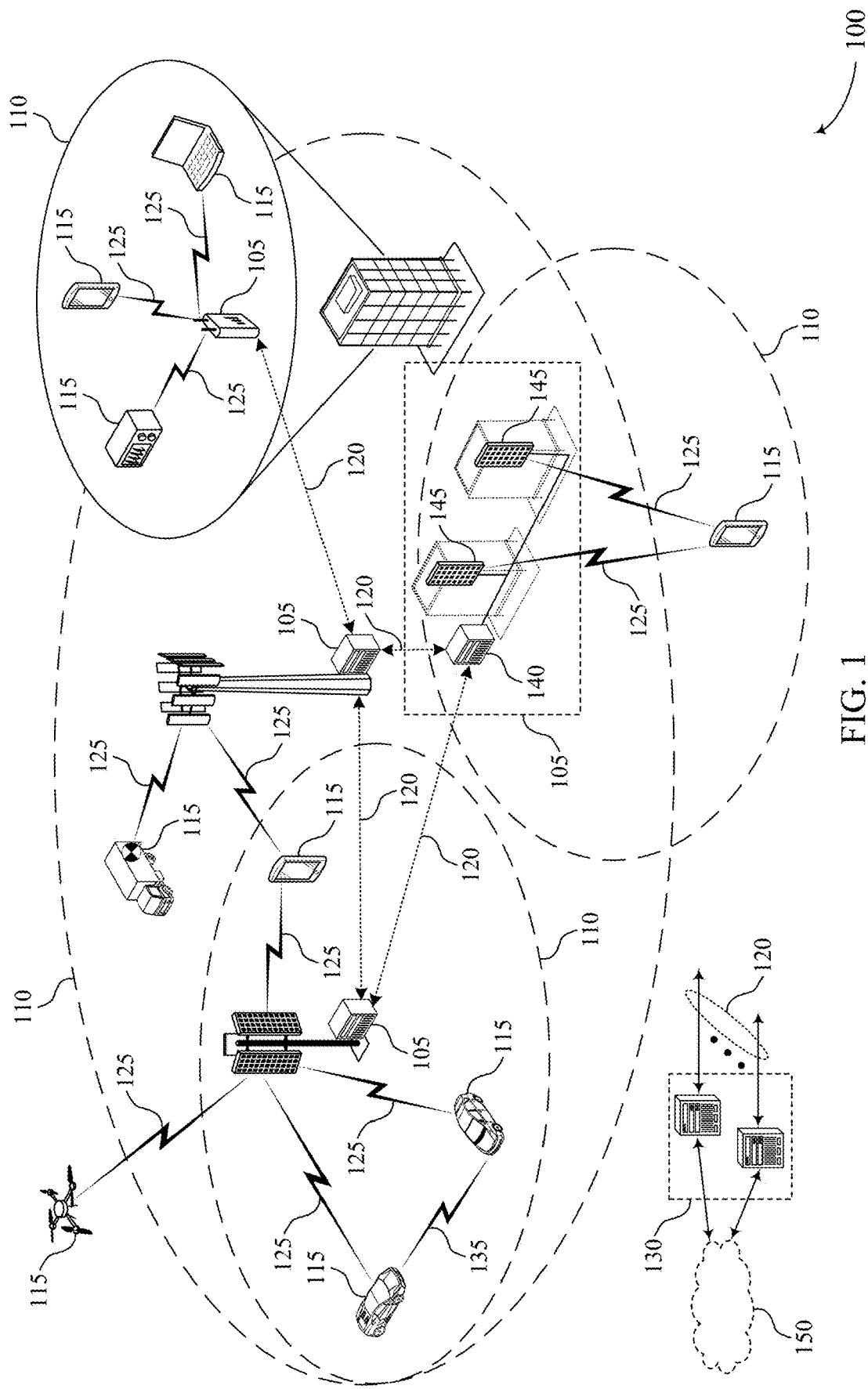
FIGS. 1 and 2 illustrate examples of wireless communications systems that support dynamic rate matching patterns for spectrum sharing in accordance with aspects of the present disclosure.

In some wireless communications systems, neighboring cells (e.g., neighboring base stations, inter-access backhaul (IAB) nodes, relay nodes, or any other service providing cells) may share a portion of a radio frequency spectrum. For example, in a wireless communications system using DSS, neighboring base stations may use the same, or overlapping portions of radio frequency spectrum band. In some cases, neighboring base stations or cells using different radio access technologies (RATs) may be configured to share at least a portion of the radio frequency spectrum. In an example, a first base station configured in accordance with a first RAT (e.g., an LTE RAT, a 4G RAT) may have an overlapping coverage area with a second base station configured in accordance with a second RAT (e.g., an NR RAT, a 5G RAT), and the first base station and the second base station may share at least a portion of the same band (e.g., a 2.1 GHz band) of the radio frequency spectrum. However, in some DSS deployments, neighboring LTE or LTE DSS cells may cause substantial intra-frequency or co-channel interference to 5G DSS cells (e.g., in locations of overlapping coverage areas between or among DSS calls), which may reduce spectral efficiency by as much as 70% without interference mitigation.

In some examples, neighboring base stations or cells may share an alignment of communications in the time domain. For example, communications associated with a first base station and communications associated with a second base station may be synchronized using a synchronized frame, a synchronized subframe timing, or any other means of timing synchronization. In some cases, interference among neighboring base stations or cells (e.g., intra-frequency neighbors) may include interference according to a periodic or otherwise configured repetition. For example, the first base station may transmit reference signals, such as cell-specific reference signals (CRSs) (e.g., in accordance with an LTE protocol), during specific symbol durations of a subframe structure (e.g., according to 2 CRS, 4 CRS, or any other CRS scheduling scheme), and such reference signals may be associated with a relatively high transmission power (e.g., having a transmission power that is 3 dB higher than data transmissions).

In some such examples, the second base station may be configured to transmit data transmissions that are scheduled to avoid symbol durations associated with certain transmissions from the first base station (e.g., CRS transmissions, data transmissions, or any other transmission associated with a relatively high transmission power). For example, a neighbor CRS rate match configuration may be implemented, where a DSS base station communicating in accordance with a NR RAT may be configured to avoid performing downlink transmissions during symbol durations associated with CRS transmissions in accordance with an LTE RAT (e.g., when using portions of a radio frequency spectrum that may be shared between or among DSS cells operating in accordance with an LTE RAT or a NR RAT). However, resources in the frequency domain of avoided symbol durations may still be available, such that avoiding the scheduling of transmissions from the first base station during symbol durations associated with transmissions (e.g., reference signal transmissions) from the second base station may be associated with an inefficient utilization of communication resources. Moreover, such techniques may be associated with signaling overhead, or may be limited to symbols associated with CRS transmission, and not data symbols that are not associated with CRS transmission.

In accordance with the examples as disclosed herein, various devices in a wireless communications system may be configured to support dynamic rate matching patterns for spectrum sharing, which may leverage various evaluations of local interference by a UE (e.g., according to UE-assisted rate matching). In some examples, a UE may be located in an environment proximal to two or more base stations, or within an overlap of coverage areas associated with two or more cells, where the two or more base stations or cells may be configured to share at least a portion of the radio frequency spectrum (e.g., in accordance with a DSS configuration, which may share a 2.1 GHz band). In such examples, the UE may be configured to communicate with a first base station of the two or more base stations using the shared portion of the radio frequency spectrum. To support dynamic rate matching patterns, the UE may perform interference measurements for resources associated with the portion of the radio frequency spectrum shared by devices configured in the spectrum sharing configuration. For example, the UE may determine (e.g., evaluate, measure) one or more interference levels for each subcarrier, for each symbol duration or symbol index, or for a combination thereof (e.g., for each resource element) of a physical resource block structure associated with communications on the shared portion of the radio frequency spectrum.

Based on the measured interference level or levels, the UE may determine or infer a presence of a repeating interference source, such as a base station or cell operating in accordance with a different RAT (e.g., transmitting a strong, repeating interferer such as a reference signal transmitted according to a relatively high power), and may signal associated information to a base station in communication with the UE to improve spectral utilization. For example, the UE may determine a rate matching pattern for a physical resource block structure, which may include an indication of various patterns of resources in the frequency domain, in the time domain, or both (e.g., a pattern of resources associated with relatively lower interference that may be suitable for a downlink transmission to the UE or reception by the UE, a pattern of resources associated with relatively higher interference that should be avoided in a downlink transmission to the UE). The UE may transmit an indication of the determined rate matching pattern to the first base station, and the first base station may perform one or more downlink transmissions to the UE based on such an indication (e.g., using an allocation of resources that is determined based at least in part on the indication). According to these and other techniques for indicating rate matching patterns for spectrum sharing, UEs may be configured to provide signaling indicative of interference local the UEs (e.g., based on measurements or evaluations of DSS interference on a symbol or resource element level), which may support the network reducing communication interference, or increasing throughput, or reducing latency in a DSS communications environment, among other benefits.

Aspects of the disclosure are initially described in the context of wireless communications systems. Aspects of the disclosure are then described in the context of a resource allocation diagram and a process flow. Aspects of the disclosure are further illustrated by and described with reference to apparatus diagrams, system diagrams, and flowcharts that relate to dynamic rate matching patterns for spectrum sharing.

FIG. 1 illustrates an example of a wireless communications system 100 that supports dynamic rate matching patterns for spectrum sharing in accordance with aspects of the present disclosure. The wireless communications system 100 may include one or more base stations 105, one or more UEs 115, and a core network 130. In some examples, the wireless communications system 100 may be an LTE network, an LTE-Advanced (LTE-A) network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, IAB nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IOT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IOT), enhanced mobile broadband (eMBB), DSS) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHZ.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, neighboring base stations 105 may share a portion of a radio frequency spectrum. For example, in a wireless communications system supporting a DSS configuration, neighboring base stations may use the same or overlapping portions of radio frequency spectrum band. In some examples, such base stations 105 may also share a time alignment. In some cases, communications associated with a first base station 105 may interfere with communications associated with a second base station 105, or vice versa.

In some examples, a UE 115 may be located in an environment proximal to two or more base stations 105, or within an overlap of coverage areas associated with two or more cells, where the two or more base stations or cells may be configured to share at least a portion of the radio frequency spectrum. In such examples, the UE 115 may perform interference measurements for resources associated with the shared portion of the radio frequency spectrum, determine a rate matching pattern (e.g., for a physical resource block), and transmit an indication of the rate matching pattern to a base station 105. The base station 105 may receive the indication of the rate matching pattern and may transmit a downlink transmission to the UE 115 with an allocation of downlink resources that is based at least in part on the indication.

Figure 2:
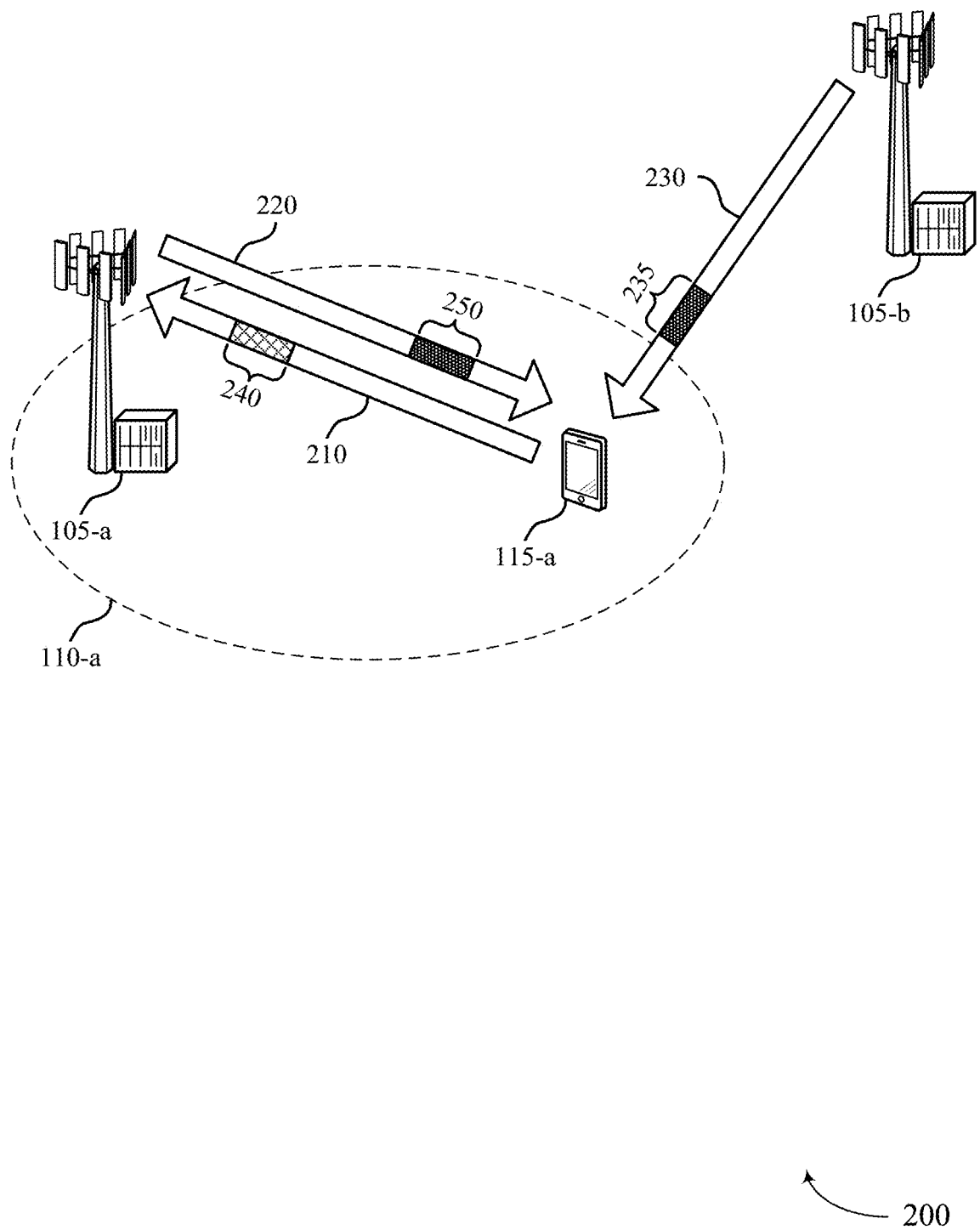

FIG. 2 illustrates an example of a wireless communications system 200 that supports dynamic rate matching patterns for spectrum sharing in accordance with aspects of the present disclosure. The wireless communications system 200 includes a UE 115-a, a base station 105-a, and a base station 105-b, which may be examples of the respective devices as described with reference to FIG. 1. In some examples, the UE 115-a and the base station 105-a may perform communications within a geographic coverage area 110-a, where the UE 115-a may perform uplink transmissions 210 (e.g., to the base station 105-a) and the base station 105-a may perform downlink transmissions 220 (e.g., to the UE 115-a). In some examples, the base station 105-b may perform transmissions 230 (e.g., downlink transmissions, signaling transmissions, reference signal transmissions), which may interfere with the communications between the UE 115-a and the base station 105-a (e.g., interfere with reception of downlink transmissions 220 by the UE 115-a).

In some examples, devices of the wireless communications system 200 may be configured to communicate using multiple layers (e.g., bandwidths, carriers, BWPs, portions of the radio frequency spectrum, or any other partitioning of the frequency domain). For example, devices communicating using an LTE RAT (e.g., the base station 105-b) may be configured to communicate using a first layer (e.g., the primary layer), which may include a 1.8 GHz band. In some cases, the first layer may correspond to communications in a low capacity environment. That is, the first layer may be used for communications between two devices in a scenario where a density of devices is relatively low (e.g., an urban environment). In a deployment where the density of devices is relatively high (e.g., a dense urban environment), wireless devices may be configured to communicate using a second layer (e.g., the secondary layer). For example, wireless devices communicating using an LTE RAT (e.g., the base station 105-b) in a location with a relatively high device density may be additionally or alternatively configured to communicate using the second layer, which may include a 2.1 GHz band. In some examples, the base station 105-a may be configured to communicate in one or both of a 3.5 GHz band or a 2.1 GHz band.

Some wireless communications systems, such as wireless communications system 200, may support communications in accordance with multiple RATs, where different base stations 105, or cells thereof, may be associated with different RATs. For example, in the wireless communications system 200, the base station 105-a may be configured for communications in accordance with a first RAT (e.g., an NR RAT, a 5G RAT) and base station 105-b may be configured for communications in accordance with a second RAT (e.g., an LTE RAT, a 4G RAT). In some cases, to support communications in accordance with different RATs, wireless communications systems may be configured to share a common frequency band for multiple RATs (e.g., in accordance with a spectrum sharing configuration, in accordance with a DSS configuration). For example, the base station 105-a may be configured in accordance with an NR RAT and the base station 105-b may be configured in accordance with an LTE RAT, and a DSS configuration may support a deployment of communications by the base station 105-a and communications by the base station 105-*b* in a same band (e.g., in a 2.1 GHz band).

In accordance with some spectrum sharing configurations, the base station 105-*a* and the base station 105-*b* (or any other proximal base station 105) may share a time alignment, where communications associated with the base station 105-*a* and communications associated with the base station 105-*b* may be synchronized in the time domain, for example, using a synchronized frame, a synchronized subframe timing, or any other means of timing synchronization. For example, a timing of physical resource blocks associated with the base station 105-*a* may be synchronized with a timing of physical resource blocks associated with the base station 105-*b*. In some examples, such a synchronization may be leveraged to support resource allocations or other evaluations of an interference environment. For example, downlink transmissions 220-*b* by the base station 105-*b* may include reference signals 335 (e.g., CRSs) that are allocated to certain subcarriers of a physical resource block configuration, certain symbols or symbol indexes of a physical resource block configuration, or both. In some cases, the base station 105-*b* may transmit reference signals 235 with a relatively high transmission power (e.g., having a transmission power that is high enough to impact or significantly interfere with other transmissions), such that interference from reference signals 235 may reduce spectrum efficiency by 70% without interference mitigation.

In some such examples, the base station 105-*a* may be configured to transmit data transmissions that are scheduled in symbol durations that avoid symbol durations associated with transmissions from the base station 105-*b* (e.g., CRSs, data transmissions, or any other transmission associated with a relatively high transmission power). For example, a neighbor CRS rate match configuration may be implemented, where the base station 105-*a* (e.g., a DSS base station communicating in accordance with a NR RAT) may be configured to avoid performing downlink transmissions in a portion of a radio frequency spectrum shared with the base station 105-*b* during symbol durations associated with transmission of reference signals 235 by the base station 105-*b* (e.g., CRS transmission in accordance with an LTE RAT). However, resources (e.g., in the frequency domain) of avoided symbol durations may still be available, such that avoiding the scheduling of transmissions by the base station 105-*a* during symbol durations associated with transmission of reference signals 235 by the base station 105-*b* may be associated with an inefficient utilization of communication resources. Moreover, such techniques may be associated with signaling overhead, or may be limited to symbols associated with CRS transmission, and not other symbols (e.g., data symbols) that are not associated with CRS transmission.

In accordance with the examples as disclosed herein, devices in the wireless communications system 200 may be configured to support dynamic rate matching patterns for spectrum sharing (e.g., in a DSS configuration). In some examples, the UE 115-*a* may be configured to perform interference evaluations on a portion of the radio frequency spectrum shared by the base station 105-*a* and the base station 105-*b*, such as evaluations in a 2.1 GHZ frequency band. For example, the UE 115-*a* may perform interference measurements (e.g., measurements of signal strength, received signal power, signal-to-noise ratio (SNR), signal-to-interference-plus-noise ratio (SINR) or any other measurement associated with monitoring or measuring a communication channel) for one or more allocation units associated with the shared portion of the radio frequency spectrum. In some cases, the UE 115-*a* may perform such interference measurements to determine respective interference levels for each subcarrier of a physical resource block, for each symbol duration of the physical resource block, or a combination thereof (e.g., for each resource element of the physical resource block).

Based on the measured interference, the UE 115-*a* may determine or infer a presence of a periodic or otherwise repeating interference source, such as the base station 105-*b*, which may be operating in accordance with a different RAT. The UE 115-*a* may signal associated information in an uplink control message 240 to the base station 105-*a* to improve spectral utilization. For example, the UE 115-*a* may determine a rate matching pattern for a physical resource block structure, which may include an indication of various patterns of resources in the frequency domain, in the time domain, or both (e.g., a pattern of resources associated with relatively lower interference that may be suitable for a downlink transmission to the UE or reception by the UE, a pattern of resources associated with relatively higher interference that should be avoided in a downlink transmission to the UE). The UE 115-*a* may transmit an indication of the determined rate matching pattern to the base station 105-*a* in the uplink control message 240

In some examples, the base station 105-*a* may transmit one or more downlink transmissions 250 to the UE 115-*a* based on a rate matching indication in the uplink control message 240 (e.g., using an allocation of resources that is determined based at least in part on the indication). For example, the base station 105-*a* may evaluate the rate matching pattern indicated in the uplink control message 240, and may allocate resources for downlink transmissions 250 based on the rate matching pattern. In such an example, allocating resources for downlink transmissions 250 may include allocating resources during a symbol duration of a detected interference source, but on a different subcarrier. According to these and other techniques for indicating rate matching patterns for spectrum sharing, the wireless communications system 200 may be configured to leverage local evaluations of a noise environment, which may support reducing communication interference, or increasing throughput, or reducing latency in a DSS communications environment, among other benefits.

Figure 3:
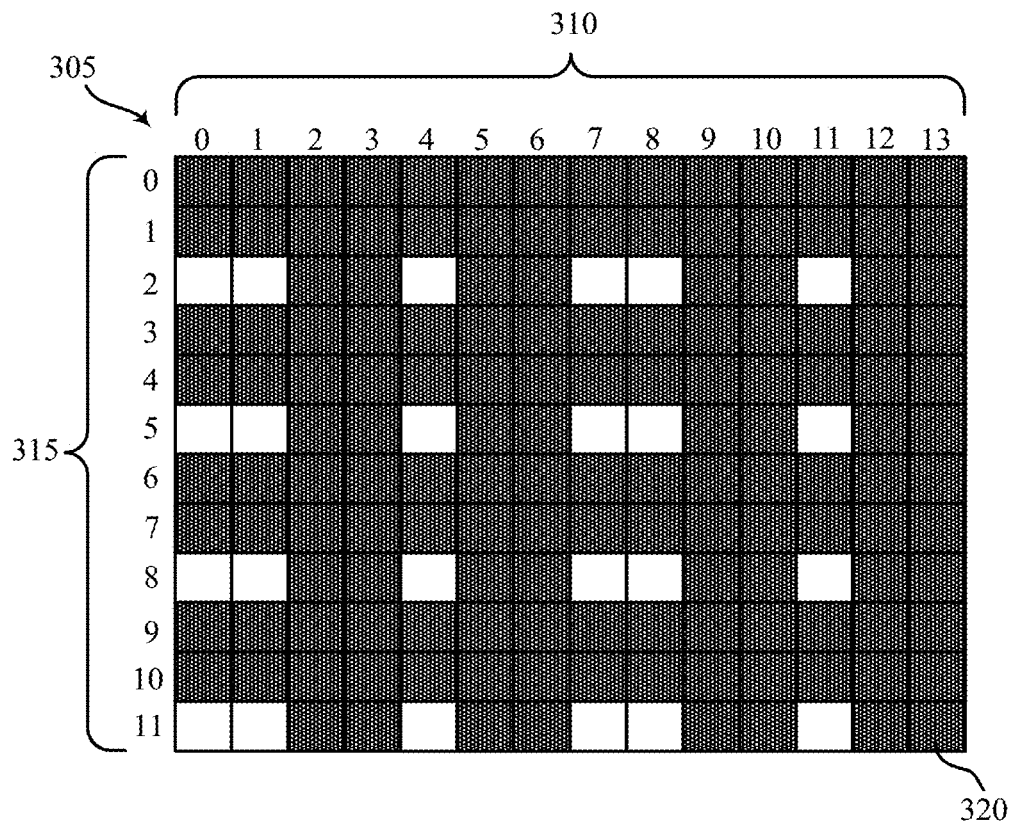
FIG. 3 illustrates an example of a resource allocation diagram that supports dynamic rate matching patterns for spectrum sharing in accordance with aspects of the present disclosure.

FIG. 3 illustrates an example of a resource allocation diagram 300 that supports dynamic rate matching patterns for spectrum sharing in accordance with aspects of the present disclosure. The resource allocation diagram 300 may refer to resources of a physical resource block structure 305, which may include a set of symbol durations 310 (e.g., a set of symbol indexes, numbered 0 through 13) over a set of subcarriers 315 (e.g., numbered 0 through 11). In some examples, a duration of the set of symbol durations 310 may be associated with a duration of a subframe, or two slots, among other corresponding durations. Each resource of a subcarrier 315 for a symbol duration 310 may be referred to as a resource element 320. Transmissions in a wireless communications system may be performed in accordance with various instances or repetitions of the physical resource block structure 305 over time. Although described with reference to a granularity of resource blocks and resource elements, techniques for dynamic rate matching patterns described herein may be implemented in accordance with other granularity in the frequency or time domain.

Resource allocations in accordance with the physical resource block structure 305 may be used by base stations 105 to transmit communications, such as downlink transmissions 205 as described with reference to FIG. 2. In some examples, resources of the physical resource block structure 305 may be allocated to the transmission of certain signaling, such as reference signals in accordance with a particular RAT. For example, a physical resource block structure 305 may include reference signal resources 330, which may be allocated to or dedicated for reference signal transmission. In some examples, the reference signal resources 330 may be allocated according to a CRS scheme, such as a 2-CRS scheme or a 4-CRS scheme in accordance with an LTE RAT, among other allocation schemes associated with reference signals in accordance with a RAT. In some examples, other aspects of downlink transmissions (e.g., physical downlink control channel (PDCCH) transmissions, physical downlink shared channel (PDSCH) transmissions, demodulation reference signal (DMRS) transmissions) may be performed using available resources 340. Although reference signal resources 330 are illustrated in certain subcarriers 315, in some examples, reference signal resources 330 may be located in different subcarriers 315 for different base stations 105 or otherwise different implementations, and accordingly may not be associated with known resources in the frequency domain without a local evaluation.

In some cases, one or more aspects of the physical resource block structure 305 may be common between or among neighboring base stations 105, such as divisions of resources in the frequency domain, in the time domain, or both and, in some examples, a timing the physical resource block structure 305 may be synchronized between such neighboring base stations 105. For example, communications associated with a first base station 105 using the physical resource block structure 305 may be synchronized in time with communications associated with a second base station 105 using physical resource block structure 305. In some spectrum sharing configurations (e.g., in a DSS configuration), such communications may be synchronized between devices performing communications in accordance with different RATs, such as when the first base station 105 is configured in accordance with an LTE RAT and the second base station 105 is configured in accordance with an NR RAT.

In some cases, transmissions of neighboring base stations 105 sharing a portion of a radio frequency spectrum may interfere with one another (e.g., causing co-channel interference) which, in some examples, may occur according to regular or otherwise repeating patterns (e.g., in the time domain, in the frequency domain) dictated by a given RAT used for the respective transmissions. For example, the first base station 105 may transmit reference signals (e.g., CRSs) using reference signal resources 330 with a relatively high transmission power (e.g., a transmission power that is 3 dB higher than transmissions using available resources 340). In such an example, the symbol durations 310 associated with reference signal resources 330 (e.g., symbol indexes 0, 1, 4, 7, 8, and 11 in an LTE 4-CRS configuration) may be subject to relatively high interference as compared to symbol durations 310 that are not associated with reference signal resources 330 (e.g., symbol indexes 2, 3, 5, 6, 9, 10, 12, and 13 in an LTE 4-CRS configuration).

In some examples, a second base station 105 (e.g., configured in accordance with a 5G DSS RAT) may be configured to perform downlink transmissions (e.g., PDSCH transmission) during symbol durations 310 that avoid the relatively high interference of reference signals according to a different RAT (e.g., an LTE RAT), such as those associated with reference signal resources 330. However, in some examples, certain resources in the frequency domain of such symbol durations 310 that are avoided by the second base station 105 may be available (e.g., be associated with relatively lower interference). For example, during symbol indexes 0, 1, 4, 7, 8, and 11, subcarrier indexes 0, 1, 3, 4, 6, 7, 9, and 10, associated with available resources 340, may be associated with relatively lower interference. As such, avoiding scheduling transmission across all subcarriers of a resource block during symbol durations, such as the symbols indexed 0, 1, 4, 7, 8, and 11, may result in an underutilization of communication resources by the second base station 105, which may be associated with relatively limited throughput or relatively greater latency.

In accordance with examples as disclosed herein, devices of a wireless communications system sharing a portion of a radio frequency spectrum band may implement a dynamic rate matching pattern to mitigate co-channel interference and improve spectral utilization, which may be supported by local evaluations of interference by one or more UEs 115. For example, a UE 115 may perform interference measurements on the portion of the radio frequency spectrum that may be shared by the neighboring base stations 105 to evaluate one or more frequencies that may be associated with a relatively high interference (e.g., interference that may disturb downlink communications with the UE 115). In some examples, during a symbol duration 310, the UE 115 may measure one or more subcarriers 315 in accordance with the physical resource block structure 305. In some cases, the UE 115 may perform measurements on all subcarriers 315 of the physical resource block structure 305 (e.g., on each of the subcarriers indexed 0 through 11). In some cases, the UE 115 may measure a subset of subcarriers of the physical resource block structure. In such cases, the subset of the subcarriers may include contiguous subcarriers, non-contiguous subcarriers, or any pattern of subcarriers. In some examples, the UE 115 may measure respective interference levels for one or more symbol durations 310. For example, the UE 115 may measure respective interference levels for each subcarrier 315 of the physical resource block structure 305 during each symbol duration 310 of the physical resource block structure 305. In another example, the UE 115 may measure respective interference levels for a subset of subcarriers 315 during a specific set of symbol durations 310.

In some examples, the UE 115 may determine a rate matching pattern based on interference levels measured by the UE 115. For example, the UE 115 may determine a pattern of subcarriers 315, or a pattern of symbol durations 310, or both (e.g., a pattern of resource elements 320 in the time and frequency domains) associated with the respective interference levels. In some cases, the UE 115 may determine a rate matching pattern including a pattern of subcarriers 315 and symbol durations 310 that are associated with a relatively low interference level. For example, the UE 115 may determine and indicate a set of resource elements 320 (e.g., a pattern of preferred resource elements 320 for subsequent downlink transmissions) such that transmissions on the indicated set of resource elements 320 may be received and decoded with a relatively high throughput (e.g., compared to downlink transmissions on resource elements 320 outside the indicated set of resource elements, which may be associated with relatively high levels of interference).

In some cases, the UE 115 may determine a rate matching pattern indicating a pattern of subcarriers 315, or a pattern of symbol durations 310, or both (e.g., a pattern of resource elements 320 in the time and frequency domains) that are associated with a relatively high interference level (e.g., an indication of resource elements 320 to avoid in subsequent downlink transmissions). For example, the UE 115 may determine and indicate a set of resource elements 320 (e.g., non-preferred resource elements 320) associated with relatively high interference that may be preferably avoided by a base station 105 in subsequent downlink transmissions.

In some examples, the UE 115 may determine a rate matching pattern specific to sets of one or more symbol durations 310. For example, the UE 115 may determine a first rate matching pattern for a first set of symbol durations 310 and a second rate matching pattern for a second set of symbol durations 310. In such an example, the first set of symbol durations 310 may be associated with reference signal resources 330 (e.g., CRSs, such as a set of symbol indexes 0, 1, 4, 7, 8, and 11) from a potentially interfering base station 105. In cases where the reference signals correspond to relatively high interference, as described with reference to FIG. 2, the first rate matching pattern may avoid the subcarriers 315 associated with reference signal resources 330. In some examples, the UE 115 may determine and indicate another rate matching pattern for another set of symbol durations 310 (e.g., for symbol indexes 2, 3, 5, 6, 9, 10, 12, and 13).

In some examples, performing resource element level interference evaluations or determining rate matching patterns may be associated with one or more thresholds. For example, the UE 115 may initiate performing interference evaluations, or determining a rate matching pattern, based on an interference threshold. In such an example, the UE 115 may compare one or more of the respective interference levels (e.g., for each subcarrier measured) to the interference threshold. In response to an interference level satisfying (e.g., meeting or exceeding) the interference threshold, the UE 115 may determine that the subcarrier 315 associated with the interference level should be avoided, or used. For example, if the interference level is equal to or above the interference threshold, the UE 115 may determine that the subcarrier 315 associated with the interference level should be avoided. In another example, if the interference level is equal to or below an interference threshold, the UE 115 may determine that the subcarrier 315 associated with the interference level may be used for subsequent downlink transmissions.

In some examples, the UE 115 may initiate performing interference evaluations, or determining a rate matching pattern, based on based on an error threshold. In such an example, the UE 115 may be configured for receiving data on one or more subcarriers 315 (e.g., in accordance with a downlink grant), and the UE 115 may attempt to decode the scheduled data and compare decoding errors to the error threshold. In response to an error level satisfying the error threshold, the UE 115 may determine to perform resource element level interference evaluations, or to indicate a desired rate matching pattern, or both. In some examples, the UE 115 may determine that one or more subcarriers 315 associated with the error level should be avoided, or used, in response to an error level satisfying a threshold. For example, if the error level is equal to or above the error threshold, the UE 115 may determine that one or more resource elements 320 associated with the error level should be avoided in subsequent downlink transmissions. In another example, if the error level is equal to or below the error threshold, the UE may determine that one or more resource elements 320 associated with the error level should be used for subsequent downlink transmissions.

The UE 115 may be configured to indicate (e.g., signal) the rate matching pattern to a base station 105, such as a base station 105 serving the UE 115, and the base station 105 may determine an allocation of resources in the time and frequency domains (e.g., according to resource elements 320 of a physical resource block structure 305) for one or more subsequent downlink transmissions. For example, the base station 105 may receive the indication of the rate matching pattern and may use, or avoid, symbol durations 310, subcarriers 315, or resource elements 320 indicated by the rate matching pattern.

In some cases, the UE 115 may transmit the indication of the rate matching pattern as a bit map corresponding to the symbol durations 310, subcarriers 315, or resource elements 320 of the physical resource block structure 305. For example, the UE 115 may transmit a sequence of binary states (e.g., logical "1's" and "0's"), indicating which symbol durations 310, subcarriers 315, or resource elements 320 may be preferably used or avoided for subsequent communications (e.g., downlink transmissions from the serving base station 105). In an illustrative example, the UE 115 may transmit an indication of a first rate matching pattern associated with symbol 0 of the physical resource block structure 305, where the first rate matching pattern may indicate subcarriers 315 associated with the available resources 340. That is, the UE 115 may indicate to the base station that the subcarriers indexed 0, 1, 3, 4, 6, 7, 9, and 10 may be preferably used for subsequent communications, where an exemplary bit map of the rate matching pattern may be [1, 1, 0, 1, 1, 0, 1, 1, 0, 1, 1, 0]. In the exemplary bit map, the logical "1's" may correspond to subcarriers 315 that are associated with relatively low interference. Alternatively, a bit map for a rate matching pattern may indicate the subcarriers 315 that should be preferably avoided for subsequent communications. In such an example, an exemplary bit map of the rate matching pattern may be [0, 0, 1, 0, 0, 1, 0, 0, 1, 0, 0, 1].

Figure 4:
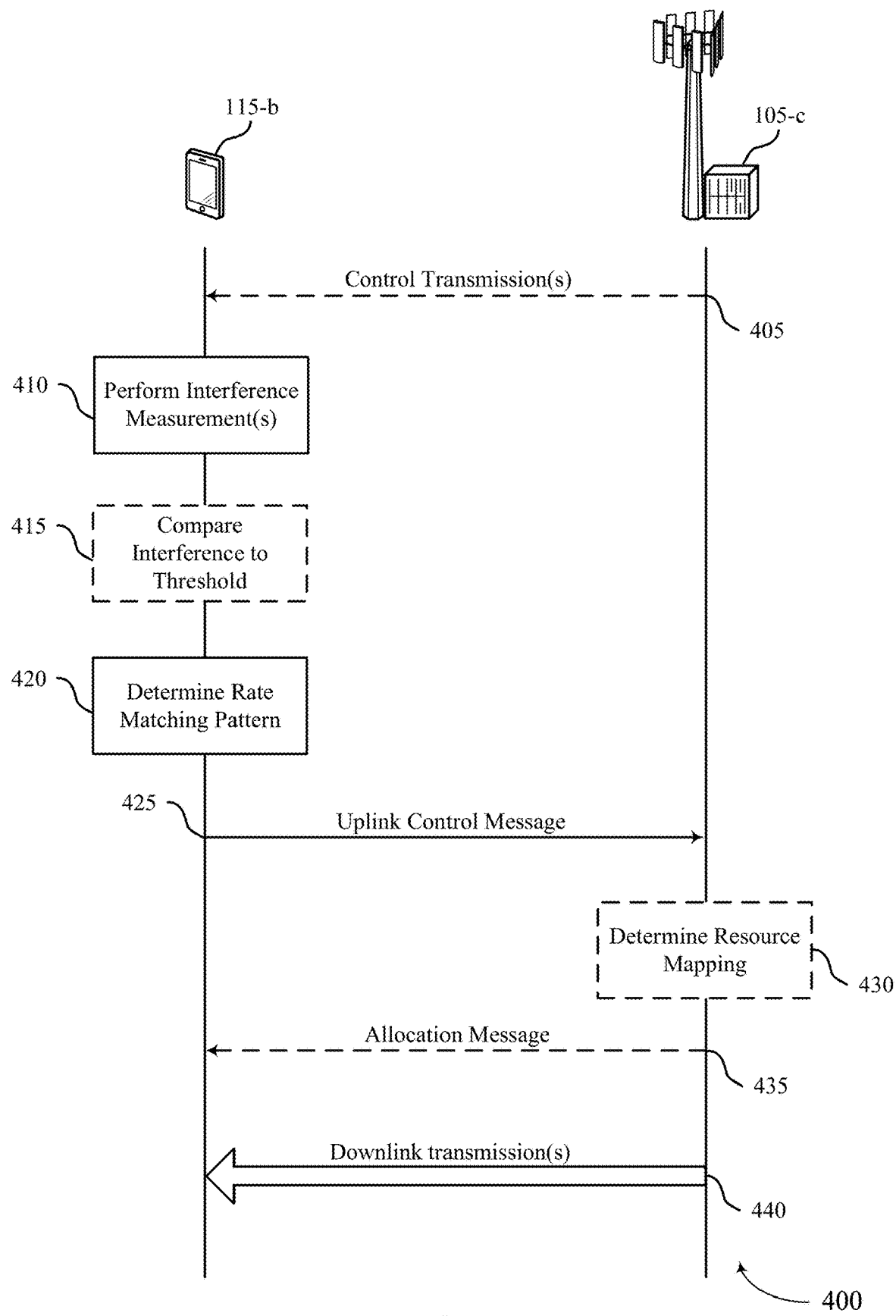
FIG. 4 illustrates an example of a process flow that supports dynamic rate matching patterns for spectrum sharing in accordance with aspects of the present disclosure.

FIG. 4 illustrates an example of a process flow 400 that supports dynamic rate matching patterns for spectrum sharing in accordance with aspects of the present disclosure. In some examples, the process flow 400 may implement aspects of a wireless communications system 100 or 200, as described with reference to FIGS. 1 and 2. For example, aspects of the process flow 400 may be performed by a UE 115-*b* and a base station 105-*c*, which may communicate using a frequency band or channel shared by one or more other wireless devices (e.g., in accordance with a DSS configuration, in a connected mode). In some examples, communications between the UE 115-*b* and the base station 105-*c* may be performed in accordance with a first RAT (e.g., a 5G RAT, an NR RAT), which may include transmissions in a portion of a radio frequency spectrum shared by one or more devices configured in accordance with a second RAT (e.g., a 4G RAT, an LTE RAT). Alternative aspects of the following may be implemented, where some steps are performed in a different order than described or are not performed at all. In some implementations, steps may include additional features not mentioned below, or further steps may be added.

In some examples, at 405, the base station 105-*c* may transmit one or more control transmissions, which may be received by the UE 115-*b*. In some examples, a control transmission at 405 may include a configuration message, which may configure one or more aspects of dynamic rate matching in accordance with examples as disclosed herein. For example, a configuration message for dynamic rate matching may indicate a radio frequency spectrum band that is configured for DSS or other spectrum sharing, interference thresholds or other triggering conditions for evaluating signal noise local to the UE 115-*b* or indicating a preferred rate matching pattern (e.g., for UE-initiated evaluations or indications), a TTI structure (e.g., a physical resource block structure) or pattern thereof for evaluating signal noise local to the UE 115-b, a rate or periodicity for evaluating interference or indicating rate matching patterns, or one or more parameters for indicating a rate matching pattern, among other configurations. In some examples, a control transmission at 405 may include activation signaling, which may activate or enable one or more aspects of dynamic rate matching patterns, or activate or enable a granularity for dynamic rate matching patterns (e.g., activating rate matching on a symbol level or resource element level). In some examples, a control transmission at 405 may include triggering or initiation signaling (e.g., for network-initiated noise evaluations, for network-initiated or network-requested indications of dynamic rate matching patterns). In various examples, control transmissions of 405 may include RRC configuration signaling, one or more MAC control elements, downlink control information (e.g., of a PDCCH transmission), or various combination thereof.

At 410, the UE 115-b may perform one or more interference measurements. For example, the UE 115-b may measure an interference level associated with a physical resource block structure, such as the physical resource block structure 305 described with reference to FIG. 3. In some examples, the UE 115-b may measure a respective interference level for each subcarrier of a set of subcarriers (e.g., all subcarriers of the physical resource block, a subset of subcarriers of the physical resource block). In some examples, the UE 115-b may measure a respective interference level for each symbol duration of a set of symbol durations (e.g., all symbol durations of the physical resource block, a subset of symbol durations of the physical resource block). In some examples, the UE 115-b may measure a respective interference level for each resource element of a set of resource elements (e.g., all resource elements of the physical resource block, a subset of resource elements of the physical resource block). In some examples, such interference measurements may support determining or inferring a periodic or otherwise repeating noise source such as a local interfering device that is operating in accordance with a different RAT.

In some examples, the UE 115-b may measure the respective interference levels in accordance with a periodic interval, which may be a statically configured interval or may be an interval signaled in a control transmission of 405. For example, the UE 115-b may measure the respective interference levels for a physical resource block according to a time interval, an interval of a quantity of physical resource block transmissions or receptions, or according to other intervals. In some examples, the UE 115-b may perform measurements of 410 according to an event-driven configuration, such as performing interference measurements when a received transmission satisfies an error threshold, when an amount of signal noise or interference satisfies (e.g., exceeds) a threshold, among other criteria. In examples of network-initiated evaluations or indications, the UE 115-b may perform the interference measurements of 410 in response to a control transmission (e.g., of 405).

In some examples, an interference measurement may be performed in accordance with a pattern of resources associated with a likely interference source, such as a pattern of resources associated with a reference signal (e.g., a CRS). For example, CRS transmissions may be performed on every third subcarrier of a physical resource block structure (e.g., according to a modulo three pattern), and the UE 115-b may perform interference measurements for every third subcarrier and average or otherwise group interference measurements according to such a pattern (e.g., a first measurement associated with subcarrier indexes 0, 3, 6, and 9, a second measurement associated with subcarrier indexes 1, 4, 7, 10, and so on). In some examples, such measurements may be repeated over a set of physical resource blocks (e.g., in the time domain) and averaged or otherwise combined, which may improve an evaluation of whether an interference source local to the UE 115-b will continue to be present during subsequent downlink transmissions by the base station 105-c (e.g., for distinguishing between a transient or intermittent interference source and a consistent interference source, such as a base station 105 transmitting reference signals).

In some examples, at 415, the UE 115-b may compare interference levels measured at 410 to a threshold. In some examples, the UE 115-b may use such a comparison to initiate a determination of a rate matching pattern (e.g., at 420), or initiate a transmission of an indication of such a rate matching pattern (e.g., at 425), or both (e.g., when one or more interference measurements, or a combination thereof, satisfy the threshold). Additionally or alternatively, the UE 115-b may compare decoding errors for a received transmissions to an error threshold, and the UE 115-b may use such a comparison to initiate a determination of a rate matching pattern (e.g., at 420), or initiate a transmission of an indication of such a rate matching pattern (e.g., at 425), or both (e.g., when a quantity of decoding errors for the received transmission satisfies the threshold).

At 420, the UE 115-b may determine a rate matching pattern based at least in part on the interference measurements of 410. In some examples, the UE 115-b may determine a first rate matching pattern for a first subset of a set of symbol durations (e.g., symbol durations associated with reference signal transmissions in accordance with a RAT that may be employed by a neighboring base station 105, such as an LTE RAT) and a second rate matching pattern for a second subset of a set of symbol durations (e.g., symbol durations not associated with reference signal transmissions in accordance with the other RAT, such as PDCCH or PDSCH symbols in accordance with the other RAT). In some cases, the UE 115-b may determine the pattern of resources in the frequency domain, in the time domain, or both that avoids reference signals or other repeating interference that may be transmitted by a neighboring base station 105.

At 425, the UE 115-b may transmit an uplink control message to the base station 105-c, which may be received by the base station 105-c. In some examples, the uplink control message of 425 may include an indication of the rate matching pattern determined at 420 (e.g., a rate matching request, a rate matching command, a rate matching pattern preferred or requested by the UE 115-b, which may be applicable to one or more data symbol durations, including symbol durations allocated to or otherwise available to a PDSCH). In some cases, the UE 115-b may transmit the indication of the rate matching pattern based on (e.g., in response to) determining that one or more interference levels satisfy the interference threshold. Additionally or alternatively, the UE 115-b may transmit the indication of the rate matching pattern based on (e.g., in response to) determining that one or more decoding errors satisfy the error threshold. In various examples, the UE 115-b may transmit the uplink control information in a measurement report, in a MAC control element, in channel state information (CSI) (e.g., within a CSI report, in a physical uplink control channel (PUCCH) transmission), among other uplink signaling.

In some examples, the indication of the rate matching pattern may be an indication of a configured pattern of resources of a physical resource block (e.g., a pattern of subcarriers, a pattern of symbol durations or symbol indexes, a pattern of resource elements). For example, when reference signal transmissions by a possible interfering base station 105 are performed on every third subcarrier of a physical resource block, the network may configure three rate matching patterns (e.g., three PDSCH rate matching patterns), which may be identified by a respective rate match index (e.g., rate match index 0 associated with subcarrier indexes 0, 3, 6, and 9, rate match index 1 associated with subcarrier indexes 1, 4, 7, and 10, and so on). The UE 115-*b* may use such rate matching patterns to indicate subcarriers detected with relatively high interference (e.g., subcarriers likely to include reference signal transmissions, subcarriers to avoid for downlink transmissions in a given symbol duration) or detected with relatively low interference (e.g., subcarriers unlikely to include reference signal transmissions, subcarriers available for downlink transmissions in a given symbol duration).

In some examples, such rate match indexes may be reported once per physical resource block and interpreted by the base station 105-*c* as being applied to all symbol indexes of a physical resource block structure, or each symbol index of a physical resource block that may be associated with reference signal transmission (e.g., symbol indexes 0, 1, 4, 7, 8, and 11 in a 4-CRS configuration, symbol indexes 0, 4, 7, and 11 in a 2-CRS configuration), or respective rate match indexes may be reported for each of the symbol indexes of the physical resource block structure. In some examples, each symbol duration may be associated with a bitmap with a field for each of the subcarrier indexes of the physical resource block structure. In some examples, for one or more symbol indexes, the UE 115-*b* may indicate no preference for a rate matching pattern (e.g., a null indication).

In some examples, at 430, the base station 105-*c* may determine a resource mapping based at least in part on the rate matching pattern indicated in the uplink control message of 425. For example, the base station 105-*c* may map information of a data transmission to resources of a physical resource block structure, which may include not mapping a PDSCH to symbols, subcarriers, or resource elements detected or indicated by the UE 115-*b* to be associated with relatively strong interference. In some examples, the determination at 430 may include an allocation of resources based on the indicated rate matching pattern and other factors, and accordingly may or may not match or be equivalent to the rate matching pattern indicated by the UE 115-*b* at 425. Thus, in some examples, at 435, the base station 105-*c* may transmit an allocation message to the UE 115-*b*, which may include an indication of the rate matching pattern determined by the base station 105-*c* at 430 (e.g., an indication of a dynamic PDSCH rate matching or resource mapping, a rate matching pattern that may be applicable to one or more subsequent or otherwise associated downlink transmissions). In other examples, the allocation message of 435 may be omitted, and the UE 115-*b* may monitor for or otherwise receive downlink transmissions in accordance with a rate matching pattern indicated at 425 (e.g., in examples where the UE 115-*b* assumes that an indicated rate matching pattern is accepted by the base station 105-*c*).

At 440, the base station 105-*c* transmit one or more downlink transmissions (e.g., PDSCH transmissions, transmissions in accordance with an NR or 5G RAT) to the UE 115-*b*, which may be received by the UE 115-*b*. In some examples, the one or more downlink transmissions may be based at least in part on the rate matching pattern indicated in the uplink control message at 425 (e.g., in accordance with the rate matching pattern indicated by the UE 115-*b* at 425, in accordance with a rate matching pattern determined by the base station 105-*c* at 430 based at least in part on the indication by the UE 115-*b* at 425). In some examples, the base station 105-*c* may apply the indicated or determined rate matching pattern for any downlink transmissions over a configured duration or other period of applicability (e.g., until a superseding rate matching pattern is requested or indicated), such that the indicated or determined rate matching pattern may be applied for downlink transmissions of 440 in a persistent or semi-persistent manner. In some examples, such techniques may reduce a frequency of interference evaluations or rate matching pattern indications by the UE 115-*b*, which may reduce signaling overhead or otherwise improve efficiency for supporting the techniques for dynamic rate matching patterns in accordance with examples as disclosed herein.

Figure 5:
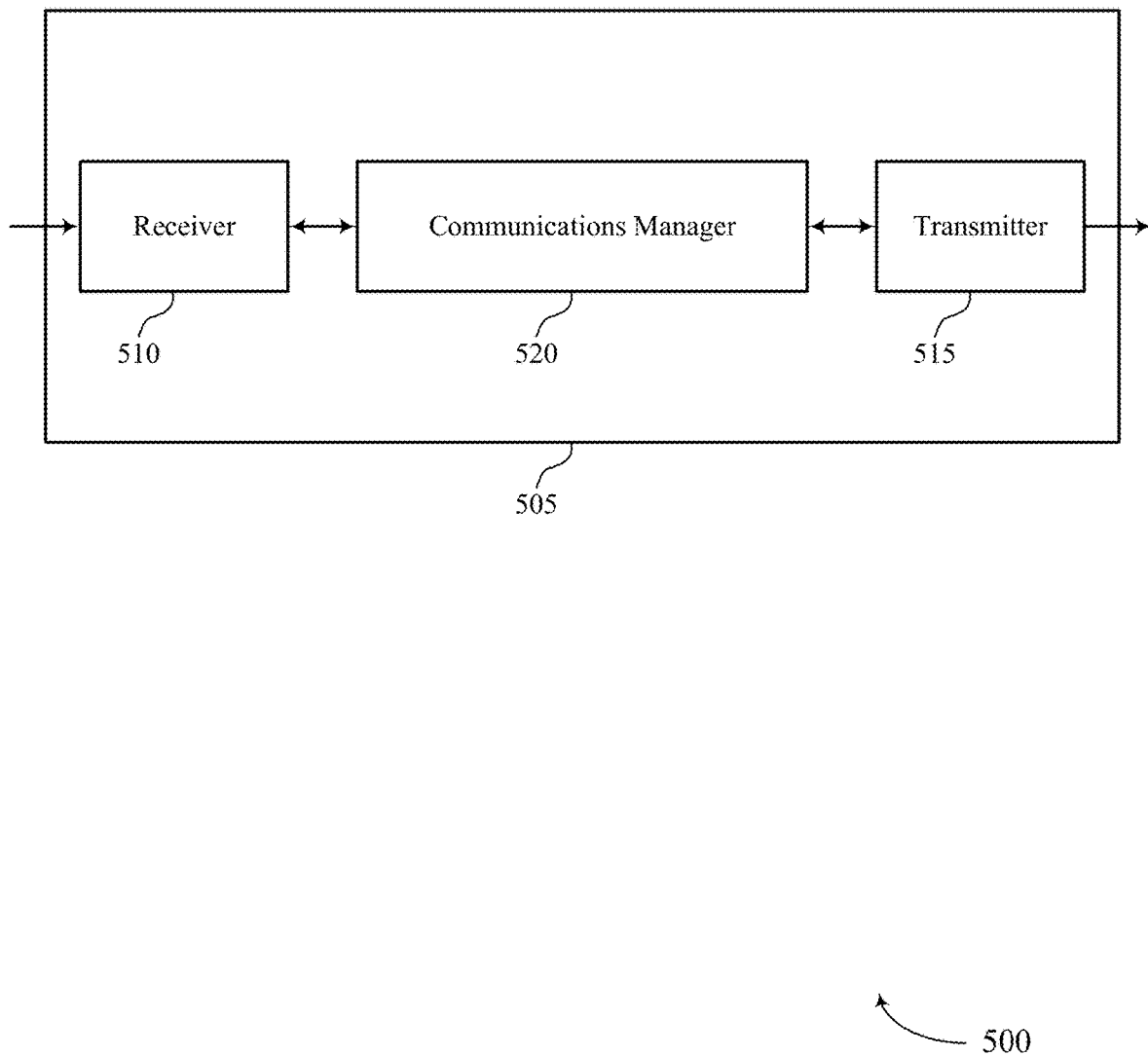
FIGS. 5 and 6 show block diagrams of devices that support dynamic rate matching patterns for spectrum sharing in accordance with aspects of the present disclosure.

FIG. 5 shows a block diagram 500 of a device 505 that supports dynamic rate matching patterns for spectrum sharing in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to dynamic rate matching patterns for spectrum sharing). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to dynamic rate matching patterns for spectrum sharing). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of dynamic rate matching patterns for spectrum sharing as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication in accordance with examples as disclosed herein. For example, the communications manager 520 may be configured as or otherwise support a means for measuring an interference level associated with a physical resource block. The communications manager 520 may be configured as or otherwise support a means for determining a rate matching pattern based on the measuring, the rate matching pattern including a pattern of resources associated with a downlink transmission (e.g., one or more subsequent downlink transmissions). The communications manager 520 may be configured as or otherwise support a means for transmitting, to a base station, an indication of the rate matching pattern. The communications manager 520 may be configured as or otherwise support a means for receiving the downlink transmission from the base station based on transmitting the indication of the rate matching pattern.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for more efficient utilization of communication resources. For example, the device 505 may be configured to evaluate an interference environment (e.g., local to the device 505) and signal (e.g., to a base station), which resources in the frequency domain, in the time domain, or both (e.g., which resources or resource elements of a physical resource block) may be preferable for allocation or avoidance in one or more subsequent downlink transmissions, which may improve a likelihood that such downlink transmissions are successfully received, or reduce a likelihood that such downlink transmissions involve retransmissions. In some examples, such evaluations or indications may be configured in accordance with one or more aspects of dynamic spectrum sharing, such as evaluations or indications in accordance with reference signals of a radio access technology (e.g., cell-specific reference signals) which may improve an ability of such a system to effectively share overlapping or shared portions of a radio frequency spectrum band.

Figure 6:
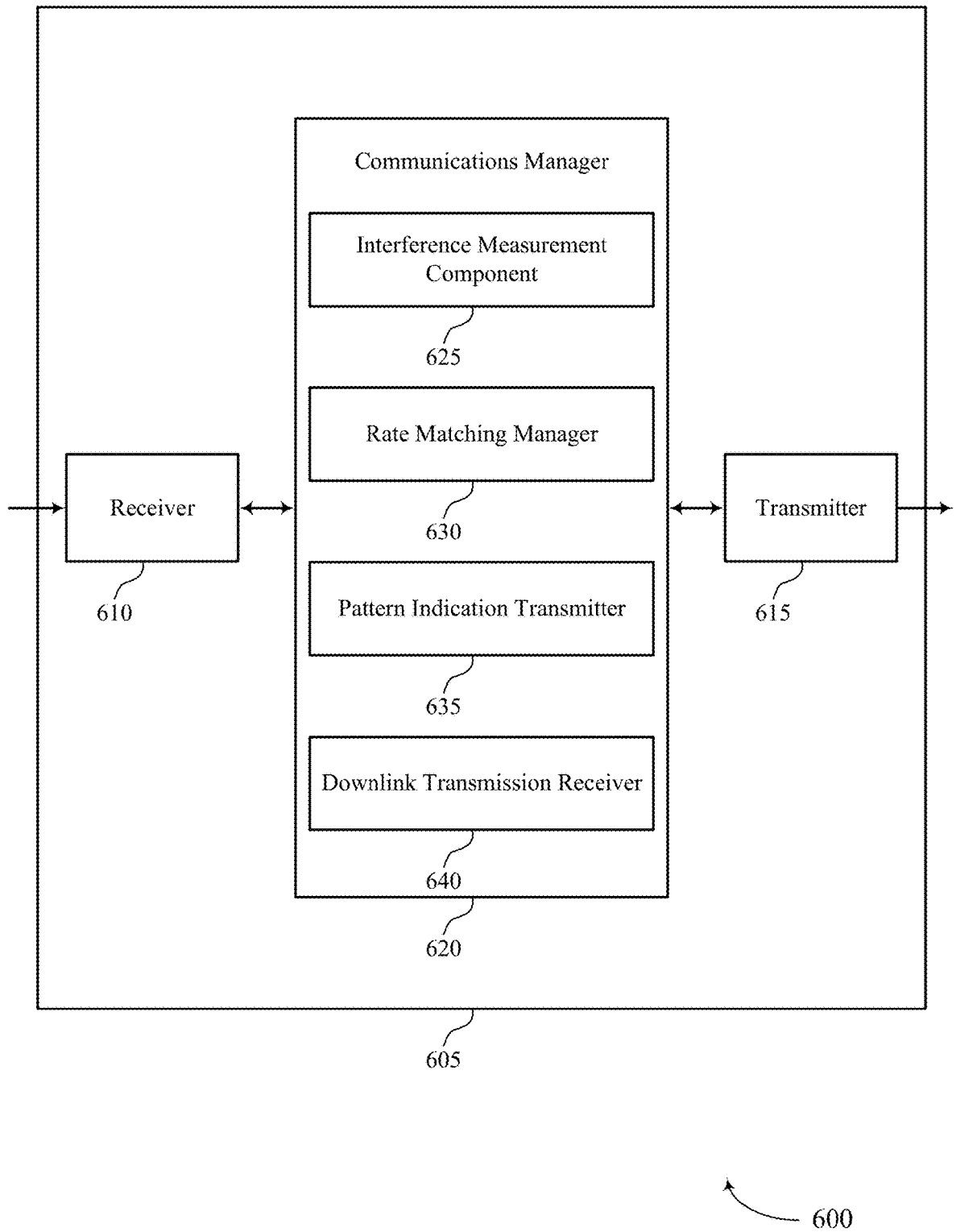

FIG. 6 shows a block diagram 600 of a device 605 that supports dynamic rate matching patterns for spectrum sharing in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to dynamic rate matching patterns for spectrum sharing). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to dynamic rate matching patterns for spectrum sharing). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of dynamic rate matching patterns for spectrum sharing as described herein. For example, the communications manager 620 may include an interference measurement component 625, a rate matching manager 630, a pattern indication transmitter 635, a downlink transmission receiver 640, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication in accordance with examples as disclosed herein. The interference measurement component 625 may be configured as or otherwise support a means for measuring an interference level associated with a physical resource block. The rate matching manager 630 may be configured as or otherwise support a means for determining a rate matching pattern based on the measuring, the rate matching pattern including a pattern of resources associated with a downlink transmission. The pattern indication transmitter 635 may be configured as or otherwise support a means for transmitting, to a base station, an indication of the rate matching pattern. The downlink transmission receiver 640 may be configured as or otherwise support a means for receiving the downlink transmission from the base station based on transmitting the indication of the rate matching pattern.

Figure 7:
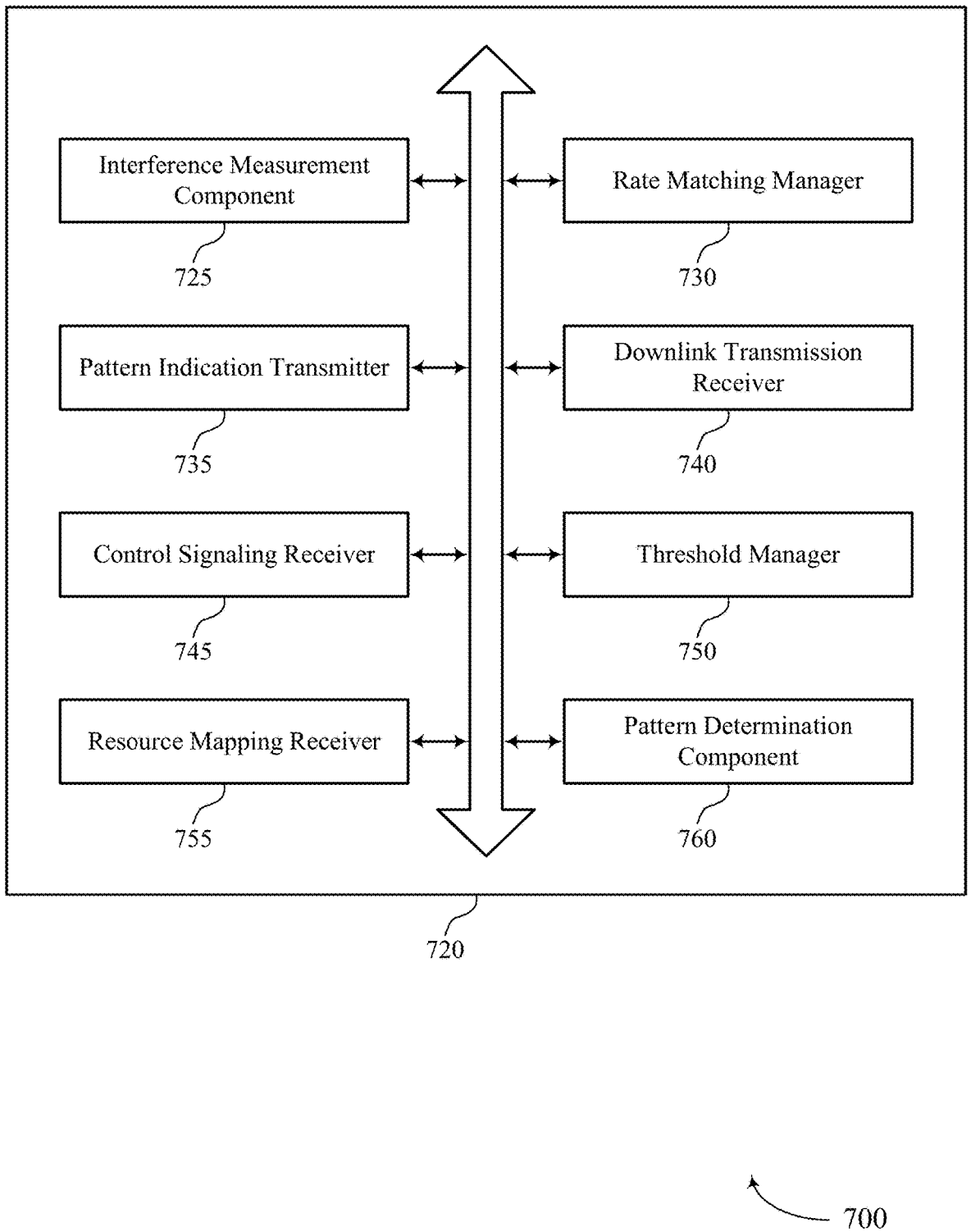
FIG. 7 shows a block diagram of a communications manager that supports dynamic rate matching patterns for spectrum sharing in accordance with aspects of the present disclosure.

FIG. 7 shows a block diagram 700 of a communications manager 720 that supports dynamic rate matching patterns for spectrum sharing in accordance with aspects of the present disclosure. The communications manager 720 may be an example of aspects of a communications manager 520, a communications manager 620, or both, as described herein. The communications manager 720, or various components thereof, may be an example of means for performing various aspects of dynamic rate matching patterns for spectrum sharing as described herein. For example, the communications manager 720 may include an interference measurement component 725, a rate matching manager 730, a pattern indication transmitter 735, a downlink transmission receiver 740, a control signaling receiver 745, a threshold manager 750, a resource mapping receiver 755, a pattern determination component 760, or any combination thereof. Each of these components may communicate, directly or indirectly, with one another (e.g., via one or more buses).

The communications manager 720 may support wireless communication in accordance with examples as disclosed herein. The interference measurement component 725 may be configured as or otherwise support a means for measuring an interference level associated with a physical resource block. The rate matching manager 730 may be configured as or otherwise support a means for determining a rate matching pattern based on the measuring, the rate matching pattern including a pattern of resources associated with a downlink transmission. The pattern indication transmitter 735 may be configured as or otherwise support a means for transmitting, to a base station, an indication of the rate matching pattern. The downlink transmission receiver 740 may be configured as or otherwise support a means for receiving the downlink transmission from the base station based on transmitting the indication of the rate matching pattern. In some examples, the rate matching pattern includes a pattern of resources of a set of multiple subcarriers, a pattern of resources of a set of multiple symbol durations, or a combination thereof.

In some examples, to support measuring the interference level, the interference measurement component 725 may be configured as or otherwise support a means for measuring a respective interference level for each subcarrier of a set of multiple subcarriers of the physical resource block.

In some examples, to support measuring the interference level, the interference measurement component 725 may be configured as or otherwise support a means for measuring, for each symbol duration of a set of multiple symbol durations of the physical resource block, the respective interference level for each subcarrier of the set of multiple subcarriers.

In some examples, to support determining the rate matching pattern, the pattern determination component 760 may be configured as or otherwise support a means for determining a first rate matching pattern for a first subset of the set of multiple symbol durations. In some examples, to support determining the rate matching pattern, the pattern determination component 760 may be configured as or otherwise support a means for determining a second rate matching pattern for a second subset of the set of multiple symbol durations.

In some examples, the first subset of the set of multiple symbol durations is associated with transmission of a reference signal (e.g., a CRS) in accordance with a first radio access technology. In some examples, to support determining the first rate matching pattern, the pattern determination component 760 may be configured as or otherwise support a means for determining the pattern of resources in the frequency domain to avoid the reference signal in accordance with the first radio access technology. In some examples, the rate matching pattern is associated with downlink transmission in accordance with a second radio access technology.

In some examples, the control signaling receiver 745 may be configured as or otherwise support a means for receiving control signaling from the base station. In some examples, the pattern indication transmitter 735 may be configured as or otherwise support a means for transmitting the indication of the rate matching pattern based on the control signaling receiver 745 receiving the control signaling.

In some examples, the threshold manager 750 may be configured as or otherwise support a means for determining that the interference level satisfies a threshold. In some examples, the pattern indication transmitter 735 may be configured as or otherwise support a means for transmitting the indication of the rate matching pattern based on the threshold manager 750 determining that the interference level satisfies the threshold.

In some examples, the threshold manager 750 may be configured as or otherwise support a means for determining that a received transmission satisfies an error threshold. In some examples, the pattern indication transmitter 735 may be configured as or otherwise support a means for transmitting the indication of the rate matching pattern based on the threshold manager 750 determining that the received transmission satisfies the error threshold.

In some examples, to support receiving the downlink transmission, the downlink transmission receiver 740 may be configured as or otherwise support a means for receiving the downlink transmission on resources in accordance with the indicated rate matching pattern.

In some examples, the resource mapping receiver 755 may be configured as or otherwise support a means for receiving an indication of a resource mapping based on the indicated rate matching pattern. In some examples, the downlink transmission receiver 740 may be configured as or otherwise support a means for receiving the downlink transmission on resources in accordance with the indicated resource mapping.

In some examples, to support measuring, the interference measurement component 725 may be configured as or otherwise support a means for measuring the respective interference level for each subcarrier in accordance with a periodic interval.

Figure 8:
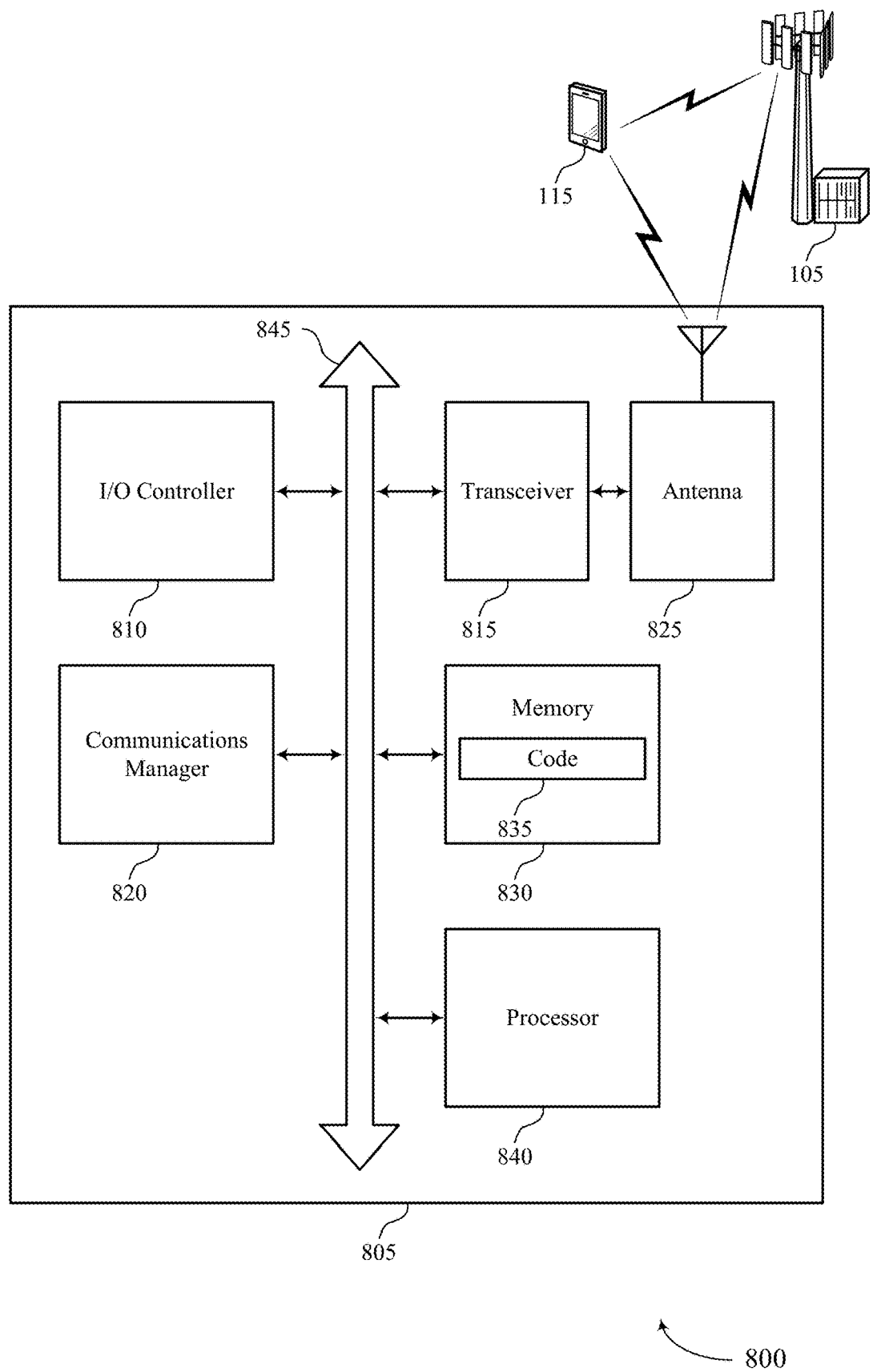
FIG. 8 shows a diagram of a system including a device that supports dynamic rate matching patterns for spectrum sharing in accordance with aspects of the present disclosure.

FIG. 8 shows a diagram of a system 800 including a device 805 that supports dynamic rate matching patterns for spectrum sharing in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting dynamic rate matching patterns for spectrum sharing). For example, the device 805 or a component of the device 805 may include a processor 840 and memory 830 coupled to the processor 840, the processor 840 and memory 830 configured to perform various functions described herein.

The communications manager 820 may support wireless communication in accordance with examples as disclosed herein. For example, the communications manager 820 may be configured as or otherwise support a means for measuring an interference level associated with a physical resource block. The communications manager 820 may be configured as or otherwise support a means for determining a rate matching pattern based on the measuring, the rate matching pattern including a pattern of resources associated with a downlink transmission. The communications manager 820 may be configured as or otherwise support a means for transmitting, to a base station, an indication of the rate matching pattern. The communications manager 820 may be configured as or otherwise support a means for receiving the downlink transmission from the base station based on transmitting the indication of the rate matching pattern.

By including or configuring the communications manager 820 in accordance with examples as described herein, the device 805 may support techniques for improved communication reliability, reduced latency, more efficient utilization of communication resources, and improved coordination between devices. For example, the device 805 may be configured to evaluate an interference environment (e.g., local to the device 805) and signal (e.g., to the base station 105), which resources in the frequency domain, in the time domain, or both (e.g., which resources or resource elements of a physical resource block) may be preferable for allocation or avoidance in one or more subsequent downlink transmissions, which may improve a likelihood that such downlink transmissions are successfully received, or reduce a likelihood that such downlink transmissions involve retransmissions. In some examples, such evaluations or indications may be configured in accordance with one or more aspects of dynamic spectrum sharing, such as evaluations or indications in accordance with reference signals of a radio access technology (e.g., cell-specific reference signals) which may improve an ability of such a system to effectively share overlapping or shared portions of a radio frequency spectrum band. In various examples, such techniques may improve coexistence between devices operating in a shared portion of a radio frequency spectrum in accordance with different radio access technologies, or improve throughput (e.g., downlink transmission throughput) to the device 805 or other devices, or reduce processing load or power consumption at the device 805 that may be associated with downlink retransmissions, or improve spectral efficiency, among other benefits.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of dynamic rate matching patterns for spectrum sharing as described herein, or the processor 840 and the memory 830 may be otherwise configured to perform or support such operations.

Figure 9:
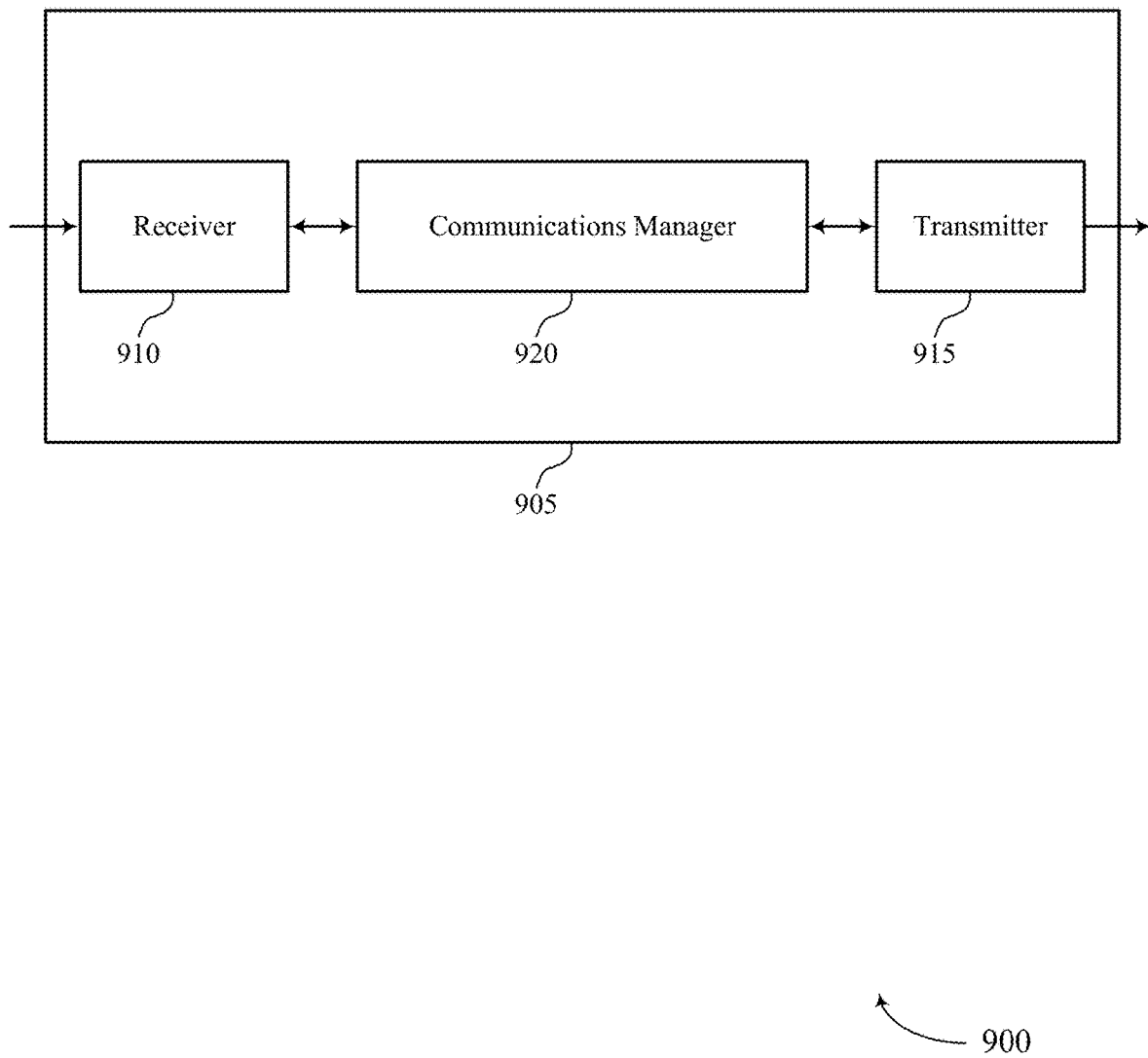
FIGS. 9 and 10 show block diagrams of devices that support dynamic rate matching patterns for spectrum sharing in accordance with aspects of the present disclosure.

FIG. 9 shows a block diagram 900 of a device 905 that supports dynamic rate matching patterns for spectrum sharing in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to dynamic rate matching patterns for spectrum sharing). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to dynamic rate matching patterns for spectrum sharing). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of dynamic rate matching patterns for spectrum sharing as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication in accordance with examples as disclosed herein. For example, the communications manager 920 may be configured as or otherwise support a means for receiving an indication of a rate matching pattern from a UE, the rate matching pattern including a pattern of resources associated with a downlink transmission (e.g., one or more subsequent downlink transmissions). The communications manager 920 may be configured as or otherwise support a means for transmitting, to the UE, the downlink transmission using an allocation of resources of a physical resource block that is based on the indication of the rate matching pattern.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for more efficient utilization of communication resources. For example, the device 905 may be configured to receive indications of an interference environment evaluated by devices (e.g., one or more UEs) served by the device 905, which may include signaling of which resources in the frequency domain, in the time domain, or both (e.g., which resources or resource elements of a physical resource block) may be preferable for allocation or avoidance in one or more subsequent downlink transmissions, which may improve a likelihood that such downlink transmissions by the device 905 are successfully received, or reduce a likelihood that such downlink transmissions involve retransmissions. In some examples, such evaluations or indications may be configured in accordance with one or more aspects of dynamic spectrum sharing, such as evaluations or indications in accordance with reference signals of a radio access technology (e.g., cell-specific reference signals) which may improve an ability of such a system to effectively share overlapping or shared portions of a radio frequency spectrum band.

Figure 10:
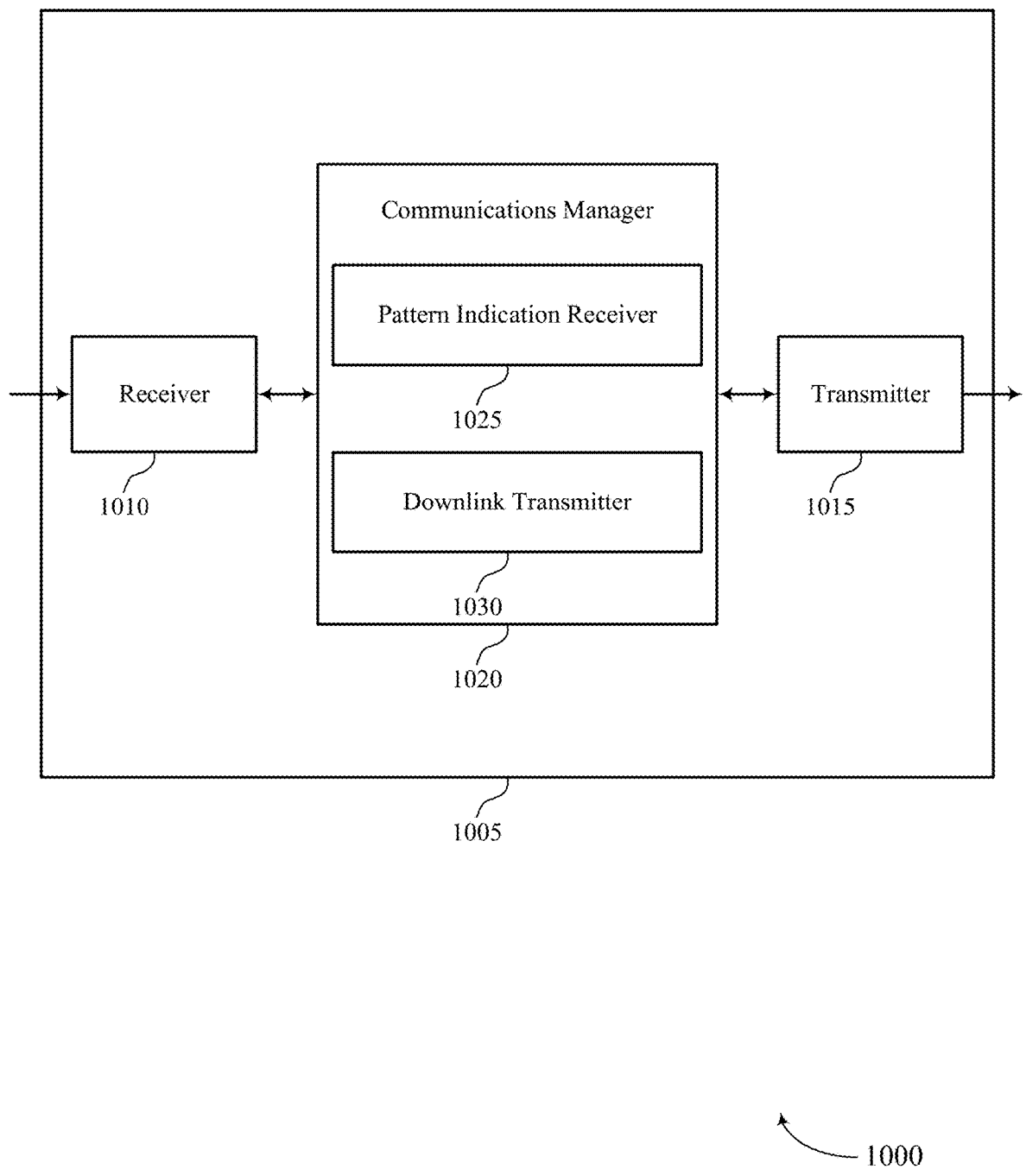

FIG. 10 shows a block diagram 1000 of a device 1005 that supports dynamic rate matching patterns for spectrum sharing in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to dynamic rate matching patterns for spectrum sharing). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to dynamic rate matching patterns for spectrum sharing). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of dynamic rate matching patterns for spectrum sharing as described herein. For example, the communications manager 1020 may include a pattern indication receiver 1025, a downlink transmitter 1030, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication in accordance with examples as disclosed herein. The pattern indication receiver 1025 may be configured as or otherwise support a means for receiving an indication of a rate matching pattern from a UE, the rate matching pattern including a pattern of resources associated with a downlink transmission. The downlink transmitter 1030 may be configured as or otherwise support a means for transmitting, to the UE, the downlink transmission using an allocation of resources of a physical resource block that is based on the indication of the rate matching pattern.

Figure 11:
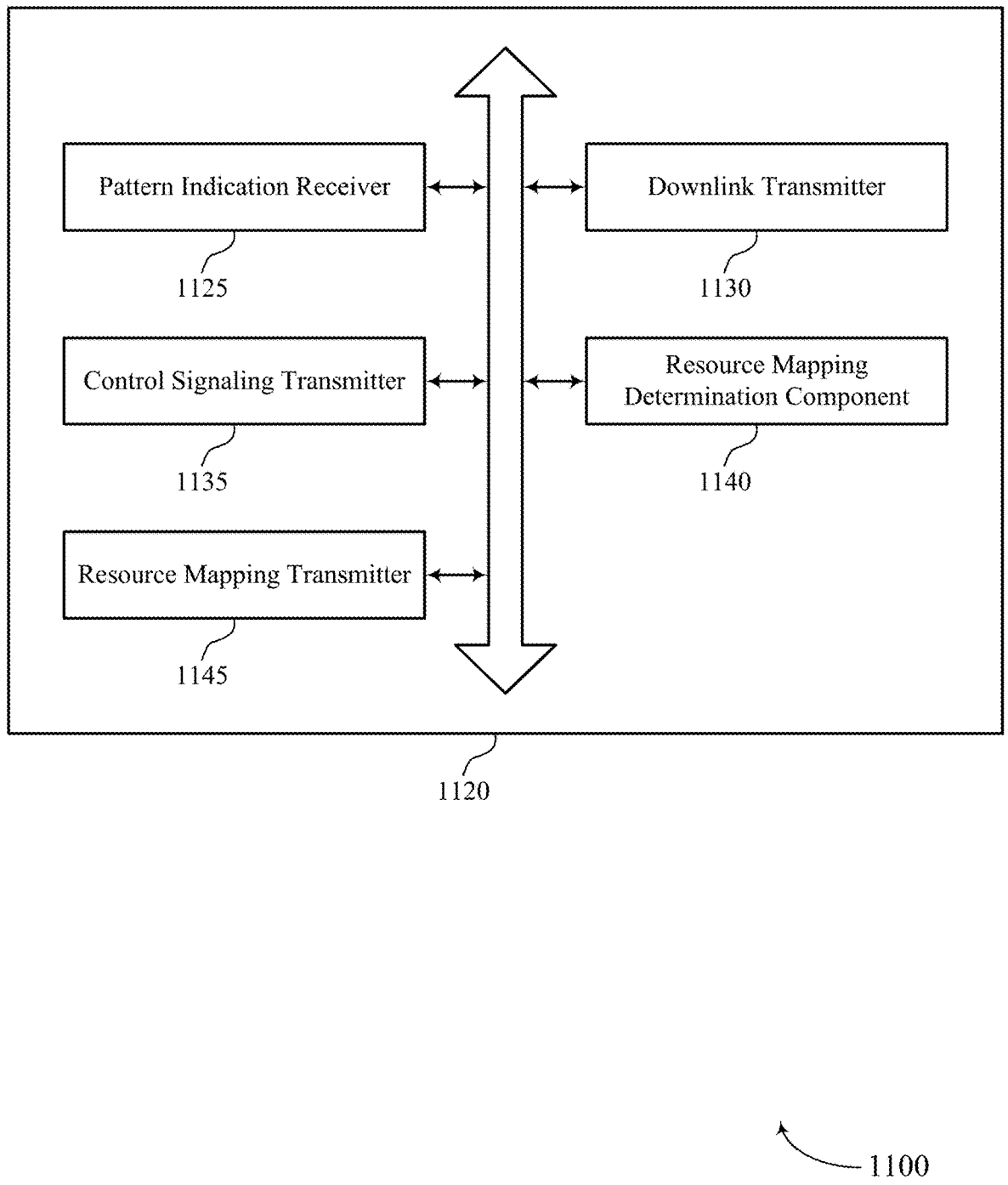
FIG. 11 shows a block diagram of a communications manager that supports dynamic rate matching patterns for spectrum sharing in accordance with aspects of the present disclosure.

FIG. 11 shows a block diagram 1100 of a communications manager 1120 that supports dynamic rate matching patterns for spectrum sharing in accordance with aspects of the present disclosure. The communications manager 1120 may be an example of aspects of a communications manager 920, a communications manager 1020, or both, as described herein. The communications manager 1120, or various components thereof, may be an example of means for performing various aspects of dynamic rate matching patterns for spectrum sharing as described herein. For example, the communications manager 1120 may include a pattern indication receiver 1125, a downlink transmitter 1130, a control signaling transmitter 1135, a resource mapping determination component 1140, a resource mapping transmitter 1145, or any combination thereof. Each of these components may communicate, directly or indirectly, with one another (e.g., via one or more buses).

The communications manager 1120 may support wireless communication in accordance with examples as disclosed herein. The pattern indication receiver 1125 may be configured as or otherwise support a means for receiving an indication of a rate matching pattern from a UE, the rate matching pattern including a pattern of resources associated with a downlink transmission. The downlink transmitter 1130 may be configured as or otherwise support a means for transmitting, to the UE, the downlink transmission using an allocation of resources of a physical resource block that is based on the indication of the rate matching pattern. In some examples, the rate matching pattern includes a pattern of resources of a set of multiple subcarriers, a pattern of resources of a set of multiple symbol durations, or a combination thereof.

In some examples, to support receiving the indication of the rate matching pattern, the pattern indication receiver 1125 may be configured as or otherwise support a means for receiving an indication of a first rate matching pattern for a first subset of a set of multiple symbol durations and a second rate matching pattern for a second subset of the set of multiple symbol durations. In some examples, the first subset of the set of multiple symbol durations is associated with transmission of a reference signal (e.g., a CRS) in accordance with a first radio access technology. In some examples, the pattern of resources avoids the reference signal in accordance with the first radio access technology.

In some examples, the rate matching pattern is associated with the downlink transmission in accordance with a second radio access technology.

In some examples, the control signaling transmitter 1135 may be configured as or otherwise support a means for transmitting control signaling to the UE. In some examples, the pattern indication receiver 1125 may be configured as or otherwise support a means for receiving the indication of the rate matching pattern based on the control signaling transmitter 1135 transmitting the control signaling.

In some examples, to support transmitting the downlink transmission, the downlink transmitter 1130 may be configured as or otherwise support a means for transmitting the downlink transmission on resources in accordance with the indicated rate matching pattern.

In some examples, the resource mapping determination component 1140 may be configured as or otherwise support a means for determining a resource mapping based on the indicated rate matching pattern. In some examples, the resource mapping transmitter 1145 may be configured as or otherwise support a means for transmitting an indication of the determined resource mapping. In some examples, the downlink transmitter 1130 may be configured as or otherwise support a means for transmitting the downlink transmission on resources in accordance with the indicated resource mapping.

Figure 12:
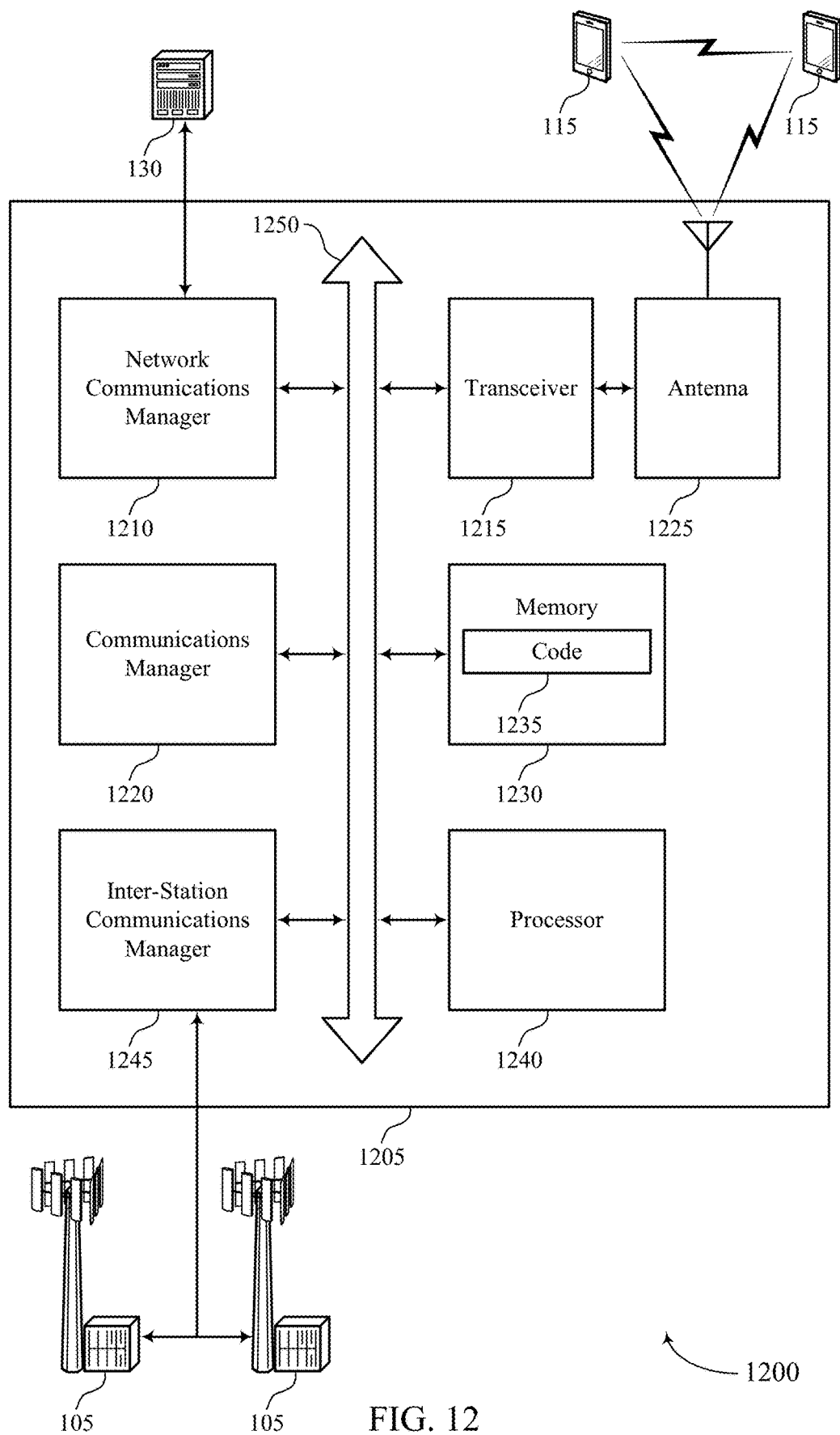
FIG. 12 shows a diagram of a system including a device that supports dynamic rate matching patterns for spectrum sharing in accordance with aspects of the present disclosure.

FIG. 12 shows a diagram of a system 1200 including a device 1205 that supports dynamic rate matching patterns for spectrum sharing in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting dynamic rate matching patterns for spectrum sharing). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communication in accordance with examples as disclosed herein. For example, the communications manager 1220 may be configured as or otherwise support a means for receiving an indication of a rate matching pattern from a UE, the rate matching pattern including a pattern of resources associated with a downlink transmission. The communications manager 1220 may be configured as or otherwise support a means for transmitting, to the UE, the downlink transmission using an allocation of resources of a physical resource block that is based on the indication of the rate matching pattern.

By including or configuring the communications manager 1220 in accordance with examples as described herein, the device 1205 may support techniques for improved communication reliability, reduced latency, more efficient utilization of communication resources. For example, the device 1205 may be configured to receive indications of an interference environment evaluated by devices (e.g., one or more UEs 115) served by the device 1205, which may include signaling of which resources in the frequency domain, in the time domain, or both (e.g., which resources or resource elements of a physical resource block) may be preferable for allocation or avoidance in one or more subsequent downlink transmissions, which may improve a likelihood that such downlink transmissions by the device 1205 are successfully received, or reduce a likelihood that such downlink transmissions involve retransmissions. In some examples, such evaluations or indications may be configured in accordance with one or more aspects of dynamic spectrum sharing, such as evaluations or indications in accordance with reference signals of a radio access technology (e.g., cell-specific reference signals) which may improve an ability of such a system to effectively share overlapping or shared portions of a radio frequency spectrum band.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of dynamic rate matching patterns for spectrum sharing as described herein, or the processor 1240 and the memory 1230 may be otherwise configured to perform or support such operations.

Figure 13:
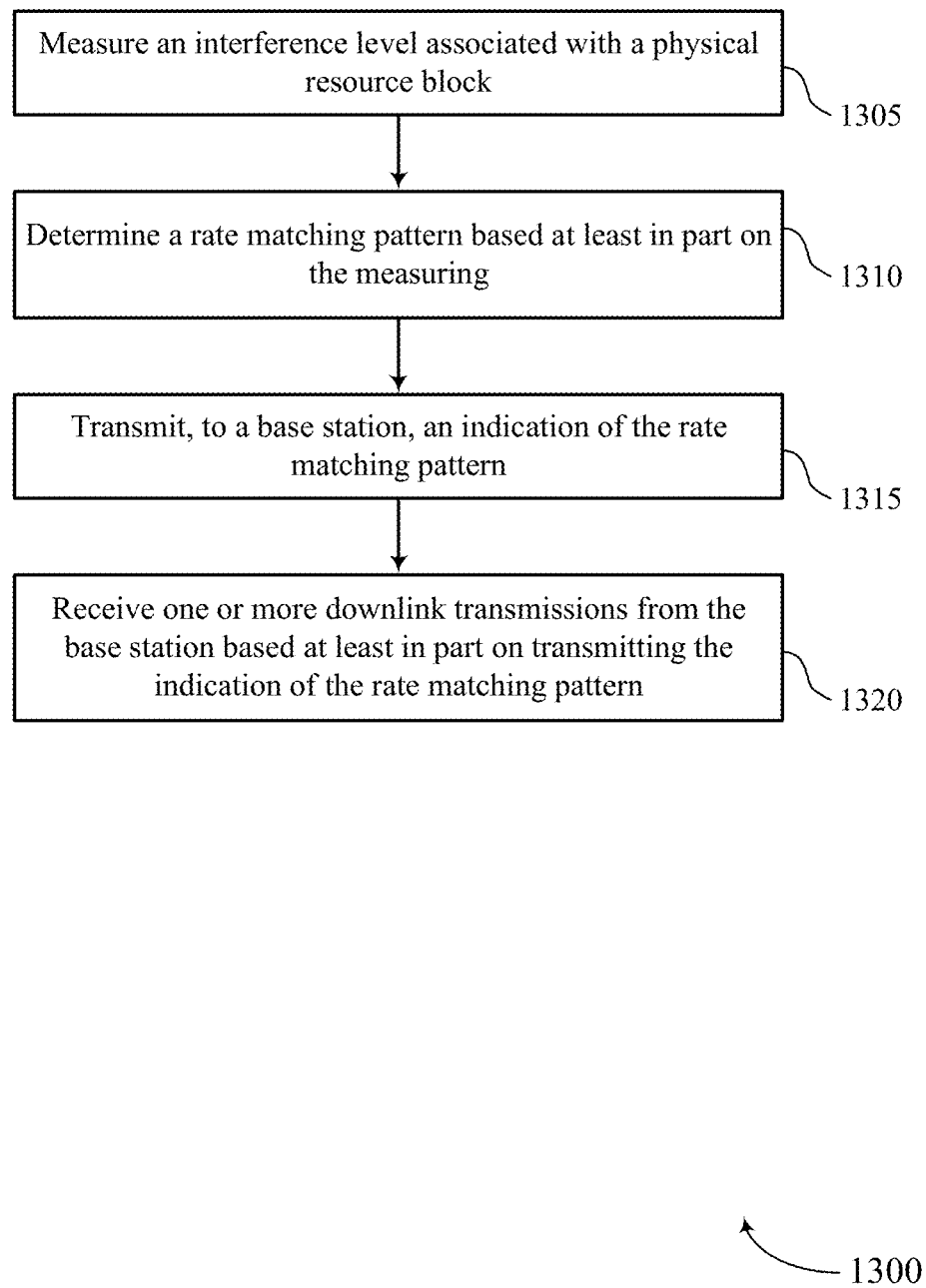
FIGS. 13 through 16 show flowcharts illustrating methods that support dynamic rate matching patterns for spectrum sharing in accordance with aspects of the present disclosure.

FIG. 13 shows a flowchart illustrating a method 1300 that supports dynamic rate matching patterns for spectrum sharing in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include measuring (e.g., at a UE) an interference level associated with a physical resource block. The operations of 1305 may be performed in accordance with examples as disclosed herein. In some examples, aspects of the operations of 1305 may be performed by an interference measurement component 725 as described with reference to FIG. 7.

At 1310, the method may include determining a rate matching pattern based on the measuring. In some examples, the rate matching pattern may include a pattern of resources associated with one or more downlink transmissions (e.g., a downlink transmission, one or more subsequent downlink transmissions). The operations of 1310 may be performed in accordance with examples as disclosed herein. In some examples, aspects of the operations of 1310 may be performed by a rate matching manager 730 as described with reference to FIG. 7.

At 1315, the method may include transmitting, to a base station, an indication of the rate matching pattern. The operations of 1315 may be performed in accordance with examples as disclosed herein. In some examples, aspects of the operations of 1315 may be performed by a pattern indication transmitter 735 as described with reference to FIG. 7.

At 1320, the method may include receiving one or more downlink transmissions from the base station based on transmitting the indication of the rate matching pattern. The operations of 1320 may be performed in accordance with examples as disclosed herein. In some examples, aspects of the operations of 1320 may be performed by a downlink transmission receiver 740 as described with reference to FIG. 7.

Figure 14:
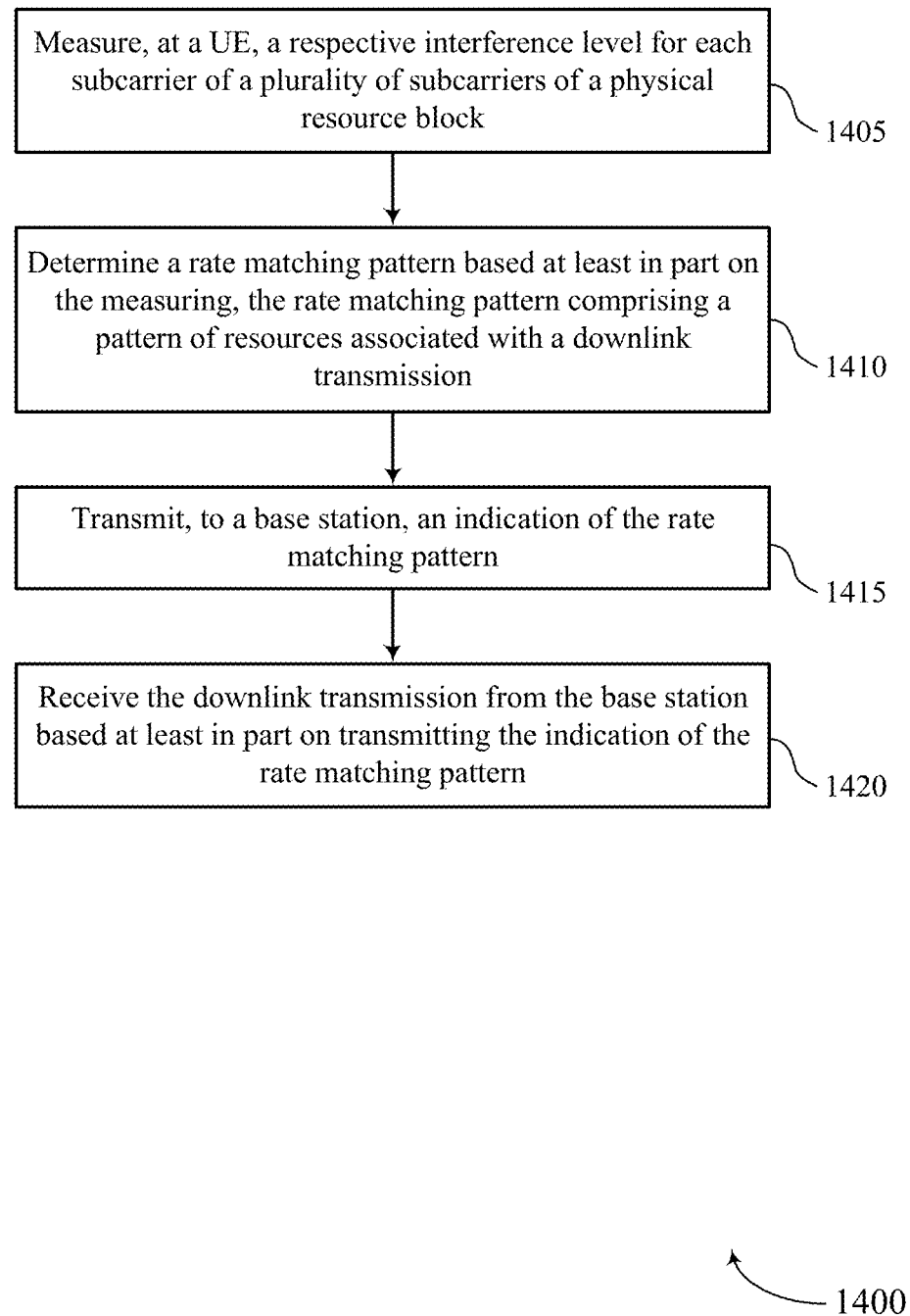

FIG. 14 shows a flowchart illustrating a method 1400 that supports dynamic rate matching patterns for spectrum sharing in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include measuring, at a UE, a respective interference level for each subcarrier of a set of multiple subcarriers of a physical resource block. The operations of 1405 may be performed in accordance with examples as disclosed herein. In some examples, aspects of the operations of 1405 may be performed by an interference measurement component 725 as described with reference to FIG. 7

At 1410, the method may include determining a rate matching pattern based on the measuring, the rate matching pattern including a pattern of resources associated with a downlink transmission. The operations of 1410 may be performed in accordance with examples as disclosed herein. In some examples, aspects of the operations of 1410 may be performed by a rate matching manager 730 as described with reference to FIG. 7.

At 1415, the method may include transmitting, to a base station, an indication of the rate matching pattern. The operations of 1415 may be performed in accordance with examples as disclosed herein. In some examples, aspects of the operations of 1415 may be performed by a pattern indication transmitter 735 as described with reference to FIG. 7.

At 1420, the method may include receiving the downlink transmission from the base station based on transmitting the indication of the rate matching pattern. The operations of 1420 may be performed in accordance with examples as disclosed herein. In some examples, aspects of the operations of 1420 may be performed by a downlink transmission receiver 740 as described with reference to FIG. 7.

Figure 15:
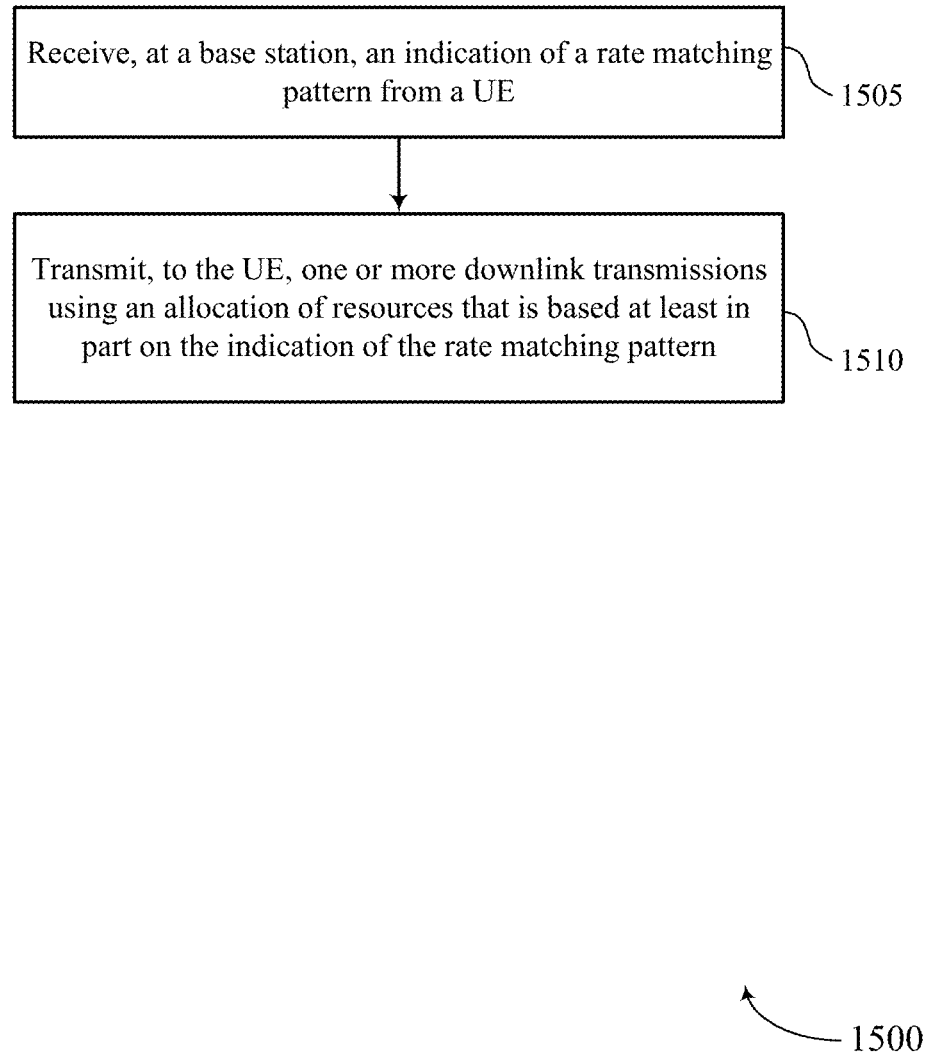

FIG. 15 shows a flowchart illustrating a method 1500 that supports dynamic rate matching patterns for spectrum sharing in accordance with aspects of the present disclosure. The operations of the method 1500 may be implemented by a base station or its components as described herein. For example, the operations of the method 1500 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1505, the method may include receiving, at a base station, an indication of a rate matching pattern from a UE. In some examples, the rate matching pattern may include a pattern of resources associated with one or more downlink transmissions (e.g., a downlink transmission, one or more subsequent downlink transmissions). The operations of 1505 may be performed in accordance with examples as disclosed herein. In some examples, aspects of the operations of 1505 may be performed by a pattern indication receiver 1125 as described with reference to FIG. 11.

At 1510, the method may include transmitting, to the UE, one or more downlink transmissions using an allocation of resources (e.g., of a physical resource block) that is based on the indication of the rate matching pattern. The operations of 1510 may be performed in accordance with examples as disclosed herein. In some examples, aspects of the operations of 1510 may be performed by a downlink transmitter 1130 as described with reference to FIG. 11.

Figure 16:
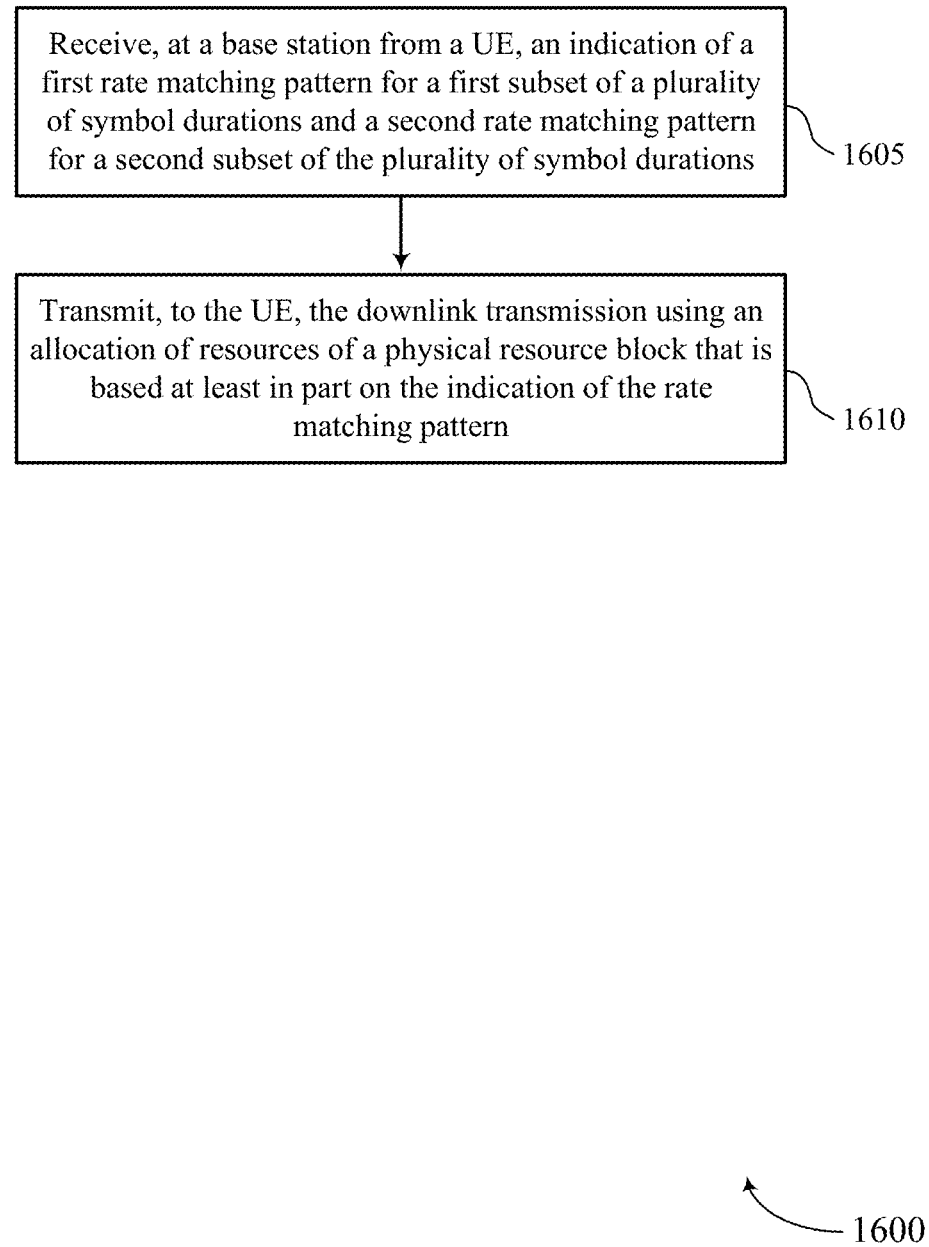

FIG. 16 shows a flowchart illustrating a method 1600 that supports dynamic rate matching patterns for spectrum sharing in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1605, the method may include receiving, at a base station from a UE, an indication of a first rate matching pattern for a first subset of a set of multiple symbol durations and a second rate matching pattern for a second subset of the set of multiple symbol durations. In some examples, the indication may include a pattern of resources associated with a downlink transmission. The operations of 1605 may be performed in accordance with examples as disclosed herein. In some examples, aspects of the operations of 1605 may be performed by a pattern indication receiver 1125 as described with reference to FIG. 11.

At 1610, the method may include transmitting, to the UE, the downlink transmission using an allocation of resources of a physical resource block that is based on the indication of the rate matching pattern. The operations of 1615 may be performed in accordance with examples as disclosed herein. In some examples, aspects of the operations of 1615 may be performed by a downlink transmitter 1130 as described with reference to FIG. 11.

The following provides an overview of aspects of the present disclosure:

Aspect 1: A method for wireless communication, comprising: measuring, at a UE, an interference level associated with a physical resource block; determining a rate matching pattern based at least in part on the measuring, the rate matching pattern comprising a pattern of resources associated with a downlink transmission; transmitting, to a base station, an indication of the rate matching pattern; and receiving the downlink transmission from the base station based at least in part on transmitting the indication of the rate matching pattern.

Aspect 2: The method of aspect 1, wherein the rate matching pattern comprises a pattern of resources of a plurality of subcarriers, a pattern of resources of a plurality of symbol durations, or a combination thereof.

Aspect 3: The method of either of aspects 1 or 2, wherein the measuring comprises: measuring a respective interference level for each subcarrier of a plurality of subcarriers of the physical resource block.

Aspect 4: The method of aspect 3, wherein the measuring comprises: measuring, for each symbol duration of a plurality of symbol durations of the physical resource block, the respective interference level for each subcarrier of the plurality of subcarriers.

Aspect 5: The method of aspect 4, wherein determining the rate matching pattern comprises: determining a first rate matching pattern for a first subset of the plurality of symbol durations; and determining a second rate matching pattern for a second subset of the plurality of symbol durations.

Aspect 6: The method of aspect 5, wherein the first subset of the plurality of symbol durations is associated with transmission of a reference signal in accordance with a first radio access technology.

Aspect 7: The method of aspect 6, wherein determining the first rate matching pattern comprises: determining the pattern of resources in the frequency domain to avoid the reference signal in accordance with the first radio access technology.

Aspect 8: The method of any of aspects 5 through 7, wherein the rate matching pattern is associated with downlink transmission in accordance with a second radio access technology.

Aspect 9: The method of any of aspects 1 through 8, further comprising: receiving control signaling from the base station; and transmitting the indication of the rate matching pattern based at least in part on receiving the control signaling.

Aspect 10: The method of any of aspects 1 through 9, further comprising: determining that the interference level satisfies a threshold; and transmitting the indication of the rate matching pattern based at least in part on determining that the interference level satisfies the threshold.

Aspect 11: The method of any of aspects 1 through 10, further comprising: determining that a received transmission satisfies an error threshold; and transmitting the indication of the rate matching pattern based at least in part on determining that the received transmission satisfies the error threshold.

Aspect 12: The method of any of aspects 1 through 11, wherein receiving the downlink transmission comprises: receiving the downlink transmission on resources in accordance with the indicated rate matching pattern.

Aspect 13: The method of any of aspects 1 through 12, further comprising: receiving an indication of a resource mapping based at least in part on the indicated rate matching pattern; and receiving the downlink transmission on resources in accordance with the indicated resource mapping.

Aspect 14: The method of any of aspects 1 through 13, wherein the measuring comprises: measuring the respective interference level for each subcarrier in accordance with a periodic interval.

Aspect 15: A method for wireless communication, comprising: receiving, at a base station, an indication of a rate matching pattern from a UE, the rate matching pattern comprising a pattern of resources associated with a downlink transmission; and transmitting, to the UE, the downlink transmission using an allocation of resources of a physical resource block that is based at least in part on the indication of the rate matching pattern.

Aspect 16: The method of aspect 15, wherein the rate matching pattern comprises a pattern of resources of a plurality of subcarriers, a pattern of resources of a plurality of symbol durations, or a combination thereof.

Aspect 17: The method of either of aspects 15 or 16, wherein receiving the indication of the rate matching pattern comprises: receiving an indication of a first rate matching pattern for a first subset of a plurality of symbol durations and a second rate matching pattern for a second subset of the plurality of symbol durations.

Aspect 18: The method of aspect 17, wherein the first subset of the plurality of symbol durations is associated with transmission of a reference signal in accordance with a first radio access technology.

Aspect 19: The method of aspect 18, wherein the pattern of resources avoids the reference signal in accordance with the first radio access technology.

Aspect 20: The method of any of aspects 17 through 19, wherein the rate matching pattern is associated with the downlink transmission in accordance with a second radio access technology.

Aspect 21: The method of any of aspects 15 through 20, further comprising: transmitting control signaling to the UE; and receiving the indication of the rate matching pattern based at least in part on transmitting the control signaling.

Aspect 22: The method of any of aspects 15 through 21, wherein transmitting the downlink transmission comprises: transmitting the downlink transmission on resources in accordance with the indicated rate matching pattern.

Aspect 23: The method of any of aspects 15 through 22, further comprising: determining a resource mapping based at least in part on the indicated rate matching pattern; transmitting an indication of the determined resource mapping; and transmitting the downlink transmission on resources in accordance with the indicated resource mapping.

Aspect 24: An apparatus for wireless communication, comprising a processor; memory in electronic communication with the processor; and instructions stored in the memory and executable to perform a method of any of aspects 1 through 14.

Aspect 25: An apparatus for wireless communication, comprising at least one means for performing a method of any of aspects 1 through 14.

Aspect 26: A non-transitory computer-readable medium storing code for wireless communication, the code comprising instructions executable to perform a method of any of aspects 1 through 14.

Aspect 27: An apparatus for wireless communication, comprising a processor; memory in electronic communication with the processor; and instructions stored in the memory and executable to perform a method of any of aspects 15 through 23.

Aspect 28: An apparatus for wireless communication, comprising at least one means for performing a method of any of aspects 15 through 23.

Aspect 29: A non-transitory computer-readable medium storing code for wireless communication, the code comprising instructions executable to perform a method of any of aspects 15 through 23.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
   one or more processors;
   one or more memories coupled with the one or more processors; and
   one or more processor-readable instructions stored in the one or more memories and executable by the one or more processors to cause the apparatus to:

measure a respective interference level for each symbol index of a plurality of symbol indexes of a physical resource block structure;
transmit an indication of a rate matching pattern based at least in part on the respective interference level measurements, the indicated rate matching pattern comprising a pattern of resources associated with a downlink transmission, and the indicated rate matching pattern comprising a first rate matching pattern for a first subset of the plurality of symbol indexes of the physical resource block structure and a second rate matching pattern for a second subset of the plurality of symbol indexes of the physical resource block structure; and
receive the downlink transmission based at least in part on the indicated rate matching pattern.

2. The apparatus of claim 1, wherein the indicated rate matching pattern further comprises a pattern of resources of a plurality of subcarriers.

3. The apparatus of claim 1, wherein the one or more processor-readable instructions are further executable by the one or more processors to cause the apparatus to:
measure a respective interference level for each subcarrier of a plurality of subcarriers of the physical resource block structure.

4. The apparatus of claim 1, wherein, to measure the respective interference levels, the one or more processor-readable instructions are executable by the one or more processors to cause the apparatus to:
measure, for each symbol index of the plurality of symbol indexes of the physical resource block structure, the respective interference level for each subcarrier of a plurality of subcarriers of the physical resource block structure.

5. The apparatus of claim 1, wherein each symbol index is associated with a respective symbol duration of a plurality of symbol durations of the physical resource block structure.

6. The apparatus of claim 1, wherein the first subset of the plurality of symbol indexes is associated with reference signal transmission in accordance with a first radio access technology.

7. The apparatus of claim 6, wherein the pattern of resources of the indicated rate matching pattern avoids the reference signal transmission in accordance with the first radio access technology.

8. The apparatus of claim 1, wherein the indicated rate matching pattern is associated with the downlink transmission in accordance with a second radio access technology.

9. The apparatus of claim 1, wherein the one or more processor-readable instructions are further executable by the one or more processors to cause the apparatus to:
receive control signaling; and
transmit the indication of the rate matching pattern based at least in part on the control signaling.

10. The apparatus of claim 1, wherein the one or more processor-readable instructions are further executable by the one or more processors to cause the apparatus to:
transmit the indication of the rate matching pattern based at least in part on one or more of the respective interference levels satisfying a threshold.

11. The apparatus of claim 1, wherein the one or more processor-readable instructions are further executable by the one or more processors to cause the apparatus to:
transmit the indication of the rate matching pattern based at least in part on an error level of a received transmission satisfying an error threshold.

12. The apparatus of claim 1, wherein the one or more processor-readable instructions are further executable by the one or more processors to cause the apparatus to:
receive the downlink transmission using resources in accordance with the indicated rate matching pattern.

13. The apparatus of claim 1, wherein the one or more processor-readable instructions are further executable by the one or more processors to cause the apparatus to:
receive an indication of a resource mapping based at least in part on the indicated rate matching pattern; and
receive the downlink transmission using resources in accordance with the indicated resource mapping.

14. The apparatus of claim 1, wherein the one or more processor-readable instructions are further executable by the one or more processors to cause the apparatus to:
measure the respective interference level for each symbol index of the plurality of symbol indexes of the physical resource block structure in accordance with a periodic interval.

15. An apparatus for wireless communication at a network device, comprising:
one or more processors;
one or more memories coupled with the one or more processors; and
one or more processor-readable instructions stored in the one or more memories and executable by the one or more processors to cause the apparatus to:
receive an indication of a rate matching pattern comprising a pattern of resources associated with a downlink transmission, the indicated rate matching pattern comprising a first rate matching pattern for a first subset of a plurality of symbol indexes of a physical resource block structure and a second rate matching pattern for a second subset of the plurality of symbol indexes of the physical resource block structure; and
transmit the downlink transmission using an allocation of resources of the physical resource block structure that is based at least in part on the indicated rate matching pattern.

16. The apparatus of claim 15, wherein the indicated rate matching pattern further comprises a pattern of resources of a plurality of subcarriers.

17. The apparatus of claim 15, wherein each symbol index is associated with a respective symbol duration of a plurality of symbol durations of the physical resource block structure.

18. The apparatus of claim 15, wherein the first subset of the plurality of symbol indexes is associated with reference signal transmission in accordance with a first radio access technology.

19. The apparatus of claim 18, wherein the pattern of resources of the indicated rate matching pattern avoids the reference signal transmission in accordance with the first radio access technology.

20. The apparatus of claim 15, wherein the indicated rate matching pattern is associated with the downlink transmission in accordance with a second radio access technology.

21. The apparatus of claim 15, wherein the one or more processor-readable instructions are further executable by the one or more processors to cause the apparatus to:
transmit control signaling; and
receive the indication of the rate matching pattern based at least in part on transmitting the control signaling.

22. The apparatus of claim 15, wherein the one or more processor-readable instructions are further executable by the one or more processors to cause the apparatus to:

transmit the downlink transmission using resources in accordance with the indicated rate matching pattern.

23. The apparatus of claim 15, wherein the one or more processor-readable instructions are further executable by the one or more processors to cause the apparatus to:
    transmit an indication of a resource mapping based at least in part on the indicated rate matching pattern; and
    transmit the downlink transmission using resources in accordance with the indicated resource mapping.

24. A method for wireless communication at a user equipment (UE), comprising:
    measuring a respective interference level for each symbol index of a plurality of symbol indexes of a physical resource block structure;
    transmitting an indication of a rate matching pattern based at least in part on the respective interference level measurements, the indicated rate matching pattern comprising a pattern of resources associated with a downlink transmission, and the indicated rate matching pattern comprising a first rate matching pattern for a first subset of the plurality of symbol indexes of the physical resource block structure and a second rate matching pattern for a second subset of the plurality of symbol indexes of the physical resource block structure; and
    receiving the downlink transmission based at least in part on the indicated rate matching pattern.

25. The method of claim 24, wherein the indicated rate matching pattern further comprises a pattern of resources of a plurality of subcarriers.

26. The method of claim 24, wherein the first subset of the plurality of symbol indexes is associated with reference signal transmission in accordance with a first radio access technology.

27. The method of claim 24, wherein the indicated rate matching pattern is associated with the downlink transmission in accordance with a second radio access technology.

28. A method for wireless communication at a network device, comprising:
    receiving an indication of a rate matching pattern comprising a pattern of resources associated with a downlink transmission, the indicated rate matching pattern comprising a first rate matching pattern for a first subset of a plurality of symbol indexes of a physical resource block structure and a second rate matching pattern for a second subset of the plurality of symbol indexes of the physical resource block structure; and
    transmitting the downlink transmission using an allocation of resources of a physical resource block that is based at least in part on the indicated rate matching pattern.

29. The method of claim 28, wherein the indicated rate matching pattern further comprises a pattern of resources of a plurality of subcarriers.

30. The method of claim 28, wherein the first subset of the plurality of symbol indexes is associated with reference signal transmission in accordance with a first radio access technology.

* * * * *